US009210220B2

(12) United States Patent
Steckley et al.

(10) Patent No.: US 9,210,220 B2
(45) Date of Patent: Dec. 8, 2015

(54) SYSTEM AND METHOD FOR INTELLIGENT AUTOMATED REMOTE MANAGEMENT OF ELECTROMECHANICAL DEVICES

(76) Inventors: Andrew Steckley, Vancouver, WA (US); Daniel R. Russell, Portland, OR (US); Steven D. Baker, Beaverton, OR (US)

( * ) Notice: Subject to any disclaimer, the term of this patent is extended or adjusted under 35 U.S.C. 154(b) by 731 days.

(21) Appl. No.: 12/567,798

(22) Filed: Sep. 27, 2009

(65) Prior Publication Data

US 2010/0083356 A1 Apr. 1, 2010

Related U.S. Application Data

(60) Provisional application No. 61/101,086, filed on Sep. 29, 2008.

(51) Int. Cl.
G06F 15/16 (2006.01)
G06F 15/173 (2006.01)
H04L 29/08 (2006.01)
H04L 12/28 (2006.01)

(52) U.S. Cl.
CPC .......... *H04L 67/125* (2013.01); *H04L 12/2818* (2013.01); *H04L 12/2834* (2013.01); *H04L 67/36* (2013.01)

(58) Field of Classification Search
USPC ............................................ 709/218; 700/90
See application file for complete search history.

(56) References Cited

U.S. PATENT DOCUMENTS

| 5,572,438 | A | 11/1996 | Ehlers |
| 5,684,710 | A | 11/1997 | Ehlers |
| 5,696,695 | A | 12/1997 | Ehlers |
| 5,924,486 | A | 7/1999 | Ehlers |
| 6,216,956 | B1 | 4/2001 | Ehlers |
| 6,904,415 | B2 * | 6/2005 | Krahn et al. .................... 705/50 |
| 7,130,719 | B2 | 10/2006 | Ehlers |
| 7,242,114 | B1 | 7/2007 | Cannon |
| 7,343,226 | B2 | 3/2008 | Ehlers |
| 7,395,126 | B2 | 7/2008 | Decker |
| 7,729,284 | B2 * | 6/2010 | Ukrainetz et al. ............ 370/254 |
| 7,783,733 | B1 * | 8/2010 | Yip et al. ...................... 709/223 |
| 8,103,763 | B2 * | 1/2012 | Slepov et al. ................. 709/224 |
| 2004/0098167 | A1 * | 5/2004 | Yi et al. ........................ 700/245 |
| 2005/0216302 | A1 * | 9/2005 | Raji et al. .......................... 705/1 |
| 2007/0114295 | A1 | 5/2007 | Jenkins |
| 2007/0167179 | A1 | 7/2007 | Shamoon |
| 2007/0179674 | A1 | 8/2007 | Ensworth |
| 2007/0198671 | A1 | 8/2007 | Motoyama |
| 2007/0232288 | A1 | 10/2007 | McFarland |
| 2007/0241203 | A1 | 10/2007 | Wagner |
| 2008/0011864 | A1 | 1/2008 | Tessier |
| 2008/0033599 | A1 | 2/2008 | Aminpour |

(Continued)

OTHER PUBLICATIONS

SmartHome INSTEON Compatible Control Software, accessed at URL: http://www.smarthome.com/1413/INSTEON-compatible-mControl-Software-V2/p.aspx on Sep. 23, 2009.

*Primary Examiner* — Richard G Keehn

(57) ABSTRACT

Monitoring and control of electromechanical devices from a central data center. The data center may be located at a separate geographic location, using broadband communication channels, such as Internet or telecom channels, and wireless HAN (home area network) communications. Such electromechanical devices may comprise, for example, an HVAC system at a small-business or residential site, a grounds-maintenance sprinkler system, or a small wind or solar energy generation and storage station.

31 Claims, 11 Drawing Sheets

(56) References Cited

U.S. PATENT DOCUMENTS

| | | |
|---|---|---|
| 2008/0039978 A1 | 2/2008 | Graham |
| 2008/0095128 A1 | 4/2008 | Fong |
| 2008/0099568 A1 | 5/2008 | Nicodem |
| 2008/0109122 A1* | 5/2008 | Ferguson et al. .............. 701/2 |
| 2008/0133065 A1 | 6/2008 | Cannon |
| 2008/0143475 A1 | 6/2008 | Turkovich |
| 2008/0146158 A1 | 6/2008 | Pan |
| 2008/0147243 A1 | 6/2008 | Rodgers |
| 2010/0205301 A1* | 8/2010 | Ansari et al. .............. 709/225 |
| 2010/0217837 A1* | 8/2010 | Ansari et al. .............. 709/218 |

* cited by examiner

SYSTEM AND METHOD FOR INTELLIGENT AUTOMATED REMOTE MANAGEMENT OF ELECTROMECHANICAL DEVICES

RELATED APPLICATIONS

The present application claims the benefit of U.S. Provisional Patent Application Ser. No. 61/101,086, filed on Sep. 29, 2008, the complete disclosure of which is hereby incorporated by reference in its entirety and for all purposes.

BACKGROUND

Various systems operating within a commercial or residential environment for the purpose of controlling environmental conditions, entertainment devices, or security systems have been around for many years. Controlling and monitoring these systems from remote locations provides significant added value and utility in many cases, but introduces additional challenges and costs. There are several such systems that have been implemented, most notably for purposes such as energy management, security, and activity monitoring. These systems often use dedicated point-to-point communications networks, pager systems, or telephone modem lines. A disadvantage of these systems is the cost of installing and maintaining these communications networks.

More recently some systems have leveraged Internet services already present at the target site, for communicating between a remote site and the target site, but this introduces additional challenges. Most sites, both commercial and residential, will have Internet firewalls in place to protect against unauthorized access to the internal network and systems. Configuring these firewalls to allow for the communications necessary is not always an easy or convenient prospect for a typical homeowner or small-site manager.

Another challenge with previous systems is the cost of installing and maintaining the equipment specific to the system itself. The initial installation may require a physical visit (or "truck-roll") by a qualified technician. Repairs or upgrades to the physical equipment and upgrades to its functionality provided by its embedded firmware may then require additional visits.

One of the most similar systems to embodiments of the present disclosure was an energy management system developed by Invensys Inc, and named GoodWatts™. It was deployed in several large pilot studies over the period 2003 to April 2007. It used a Linux-based gateway device, and devices that included a thermostat and load-control module which were outfitted with 802.15.4 capable radio units operating in the 900 MHz and 2.4 GHz frequency bands. The system leveraged the Internet to provide two-way communications, but the system had several deficiencies, which embodiments of the present disclosure overcome.

In the GoodWatts™ system, communications between the data center and the gateway located at each remote site were typically initiated from the server side. Therefore, TCP/IP connections needed to be established by the servers to the gateways. To do this the GoodWatts gateway required connection in front of, or on the non-protected side of, the customer's firewall. All site communications had to be routed through the GoodWatts™ gateway, which raised severe concerns for customers regarding functionality and security of their network. Since the GoodWatts gateway was located on the non-protected side of the firewall, it was open to external cyber-security attacks; and since all customer data was routed through the gateway, the potential for damage caused by cyber-security attacks was high.

However, this design choice was taken for the GoodWatts system since establishing the gateway behind the customer's firewall would present additional challenges. These kinds of systems are readily impeded by common firewall restrictions present at, or introduced into, the remote site's LAN. When this occurs, it necessitates special reconfiguration of the LAN by customer service technicians and, in some cases, the introduction of additional modem hardware at the site in order to work around the need to maintain various firewall settings.

The GoodWatts system also lacked a modular firmware architecture such that it could not be readily extended to support additional devices, or to support entirely different functional site-management applications.

The GoodWatts system was neither sufficiently scalable nor economical enough to succeed in the market place.

It is with respect to these and other considerations that the present disclosure has been made.

SUMMARY

The object of the present disclosure is to provide two-way monitoring and control communication, in order to facilitate automated and interactive management of specific physical application systems located at remote sites such as small-businesses or residential premises.

Some embodiments of the present disclosure use a microprocessor-based gateway device located at the site, which communicates wirelessly with individual remote devices located around the site such as thermostats, fans, or air vent actuators. This specification and associated claims uses the term remote device or the more descriptive remote electromechanical device interchangeably. The gateway firmware is responsible for scheduling and processing the various data sampling and control commands applied to the remote devices. It also periodically communicates directly with a central data center over broadband Internet, WAN, or telecom channels, to upload monitored data and receive new directives related to the commissioning, monitoring, and control of devices as well as diagnostic and administrative directives for the gateway device itself; however, in the absence of connectivity to the data center, due to broadband or telecom service interruptions, the gateway is able to continue to perform the ongoing automated management of the local system without loss of functionality or data.

The gateway is responsible for several functions including: Monitoring the health of the local wireless network and reconfiguring it to improve quality when indicated; providing general device management functionality; initiating communications or "call-homes" to the data center on a scheduled basis to exchange data and control directives; hosting device handler firmware modules, which handle device specific monitoring and control functions; hosting control directive firmware modules, which provide specific functionality related to device and system management; caching data between call-home communications to the data center or during extended periods of broadband connectivity loss.

Embodiments of the present disclosure are different from other systems and methods in that these embodiments: may use a wireless link, instead of other channels such as a data cable or power-line, to communicate to the remote devices; provides the ability to control multiple devices in remote locations; allows for multiple co-existing graphical interfaces to be available to a user to capture control requests and inform the user on the immediate result of action taken by the device; is extensible so that entirely new types of devices and control functionality may be introduced to a deployed system; uses a powerful intelligent gateway capable of handling a considerable level of automated functionality at the local site; can continue to function for extended periods without broadband connectivity; and uses an asynchronous polling model to communicate between the remote managed site and the central data center thereby making the system more reliable and less susceptible to common network firewall issues.

These and other features and advantages, which characterize the present disclosure, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present disclosure are directed to systems and methods for intelligent automated remote management of devices. In the following detailed description, references are made to the accompanying drawings that form a part hereof, and in which are shown, by way of illustrations, specific embodiments or examples. These embodiments may be combined, other embodiments may be utilized, and structural changes may be made without departing from the spirit or scope of the present invention. The following detailed description is therefore not to be taken in a limiting sense and the scope of the present application is defined by the appended claims and their equivalents.

Figure 1:
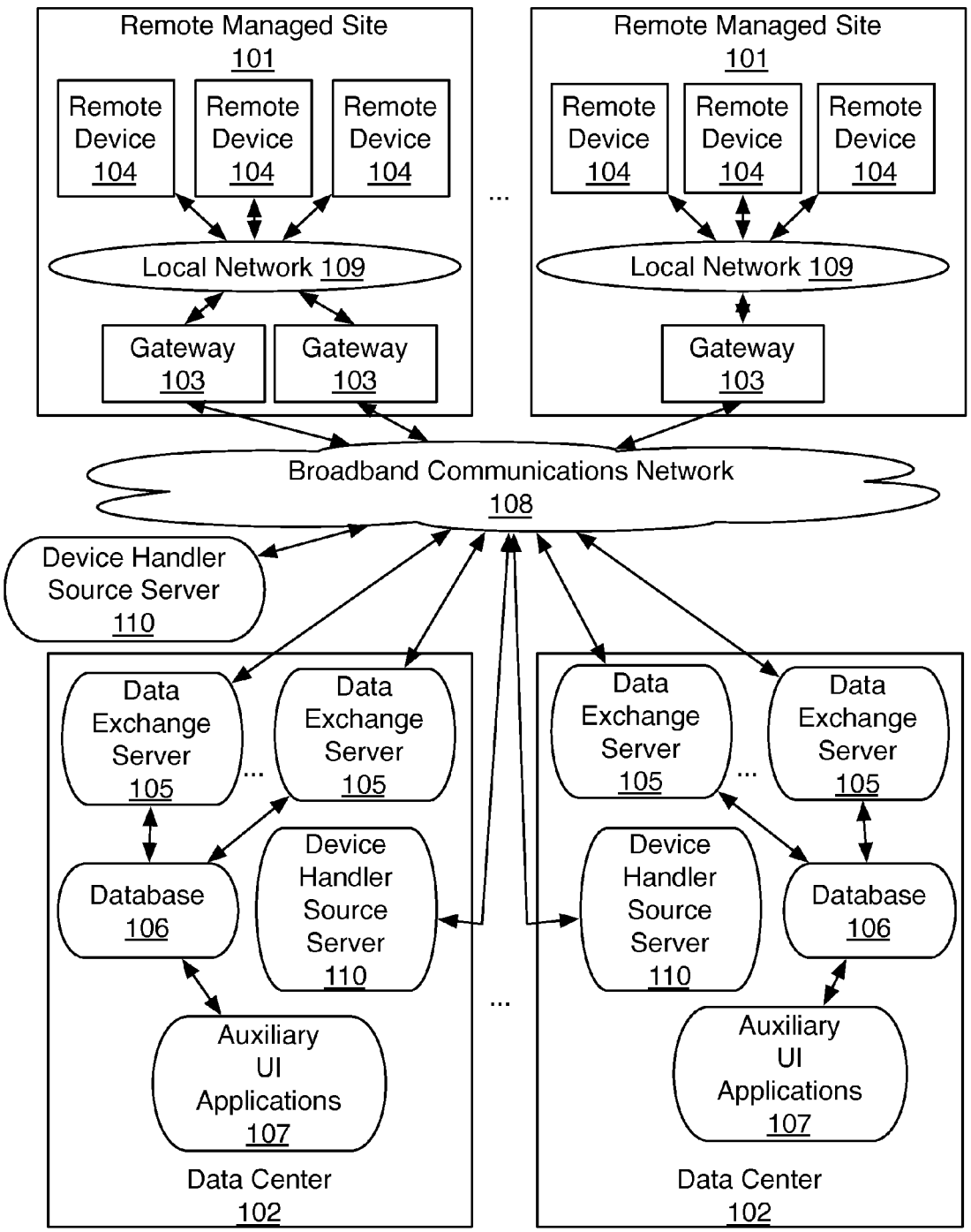
FIG. 1 is a component schematic of an embodiment of a system of the present disclosure.

Referring now to the drawings, in which like numerals refer to like elements through the several figures, aspects of embodiments of the present disclosure and an example of a computing operating environment will be described. FIG. 1 shows an example of the overall system, including a plurality of gateways [103] and a plurality of remote devices [104], all located at a remote managed site [101]; and a plurality of data exchange servers [105], a database [106], and possibly auxiliary UI applications [107] that also access the database, all located at a data center [102]. There may be a plurality of the remote managed sites and a plurality of the data centers. A device handler source server [110] provides firmware to the gateways to control the remote devices and might be deployed on the same hardware as the data exchange server or on another server in the data center, or at another location. Alternatively, the data exchange server may provide a network path (e.g., a Universal Resource Locator (URL) with an IP address or a Domain Name), to the gateway for the gateway to download the appropriate device handler firmware module, which will be described in reference to FIG. 5, from the device handler source server. The architecture supports a database that maps remote device types to the network path where the appropriate device handler firmware module (or other firmware module, such as an application firmware module) resides for the gateway. Alternatively, third-party servers could host the device handler firmware modules, and when a request for a particular device handler firmware module is received from the gateway, the device handler source server could download the requested device handler firmware module from the third-party server for use by the gateway. With any of these methods, the gateway can download the correct device handler firmware module. This ability for the device handler firmware module to be accessed by the gateway allows the system to have Plug and Play functionality across multiple networks of different types, for example across IP and Bluetooth® networks or across IP and ZigBee® networks. The architecture supports remote devices [104] developed by third parties, and device handler firmware modules to support these third-party remote devices [104] may be located on a device handler source server [110] that is outside of the data center.

In the embodiment shown in FIG. 1, communication exchanges between the gateway and the data exchange server occur through a broadband communications network [108]. We note that communication exchanges may occur over any communication medium, including proprietary RF solutions as used by the RIM Blackberry™, over telephone networks (which might have modems as the endpoints), cellular, PCS, and the like. Similarly, the communication protocol may be Internet Protocol (IP) or any other protocol that support the communication exchange needs of the system. The data exchange server at the data center handles the communication exchanges that are initiated by the gateway located at remote managed site [101], as well as data exchanges with the database. The database is also accessed by additional auxiliary UI applications [107] through which users may enact control of the system by causing control directives for gateways [103] and remote devices [104] to be inserted into the database, and monitoring of the system, by reading data in the database that has been inserted there by the data exchange server. Data in the database may include data measured by one or more remote devices, the status of the gateway and the status of the one or more remote devices. Data acquired from remote device [104] is transferred across local network [109] to the gateway. The local network [109] may be a ZigBee®, Bluetooth®, 802.15.4, 802.15.6, UWB, 802.11 or wired, e.g. 802.3 network. The local network may also be a proprietary network solution. Typically, a Bluetooth® or ZigBee® network is not an IP network, and the gateway is able to communicate, using protocol appropriate to the upstream communications, to the data center [106], and is adapted to communicate, using protocol appropriate to the downstream communication, to the remote devices [104]. The functions of the data exchange servers [105], the database [106], the auxiliary UI applications [107], and any other server functions may be disposed on a single piece of hardware, or on a separate piece of hardware for each function. Further, multiple data exchange servers [105], multiple servers supporting the database [106], and multiple servers supporting the auxiliary UI applications [107] could be used. Because the communication exchange between the gateway [103] and the data exchange server [105] is stateless, there is no dependence on using any particular server. One data exchange server [105] could transmit a control directive and a different data exchange server [105] could process the response to that control directive. The stateless communication, particularly when coupled with the call-home protocol (described in more detail with reference to FIG. 6) allows the gateway to communicate to any data exchange server [105] without respect to the data exchange server on which prior communication exchanges took place. This flexibility in communication exchange allows the data exchange server functions to be located anywhere, including across multiple data exchange servers [105] in multiple locations.

Figure 2:
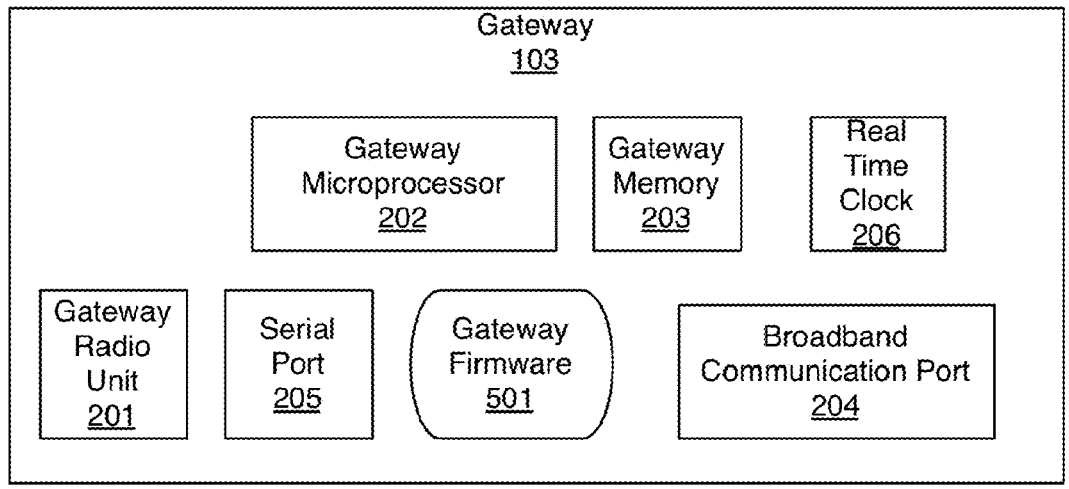
FIG. 2 is a component schematic of embodiments of physical elements of the gateway.

As shown in FIG. 2, gateway [103] includes a gateway microprocessor [202], a gateway firmware [501], a gateway memory [203], a real-time clock [206], a gateway radio unit [201], a serial port [205], and peripherals including a broadband communication port [204] enabling it to communicate on a broadband network for exchanging information with the data exchange servers located at the data center. In one embodiment, this communication port is an Ethernet port for TCP/IP based communication over a LAN, WAN, or public Internet. In another embodiment, the gateway includes a cellular phone module for the broadband communications network. In yet another embodiment, the gateway may access the broadband communications network using IEEE 802.16 WiMax protocol. Other protocols could also be used. Instructions, known as control directives, received by the gateway from the data center are stored in memory until at least the time when the control directive is executed. Non-exclusive examples of the execution of the control directive might include changing settings (actuation), reading sensor values, upgrading firmware, or other actions described elsewhere in the present disclosure. Any responses to executing a control directive are stored until the next call-home communication exchange with the data center occurs. As used herein, the term communication exchange denotes a call-home data exchange communication.

Figure 3:
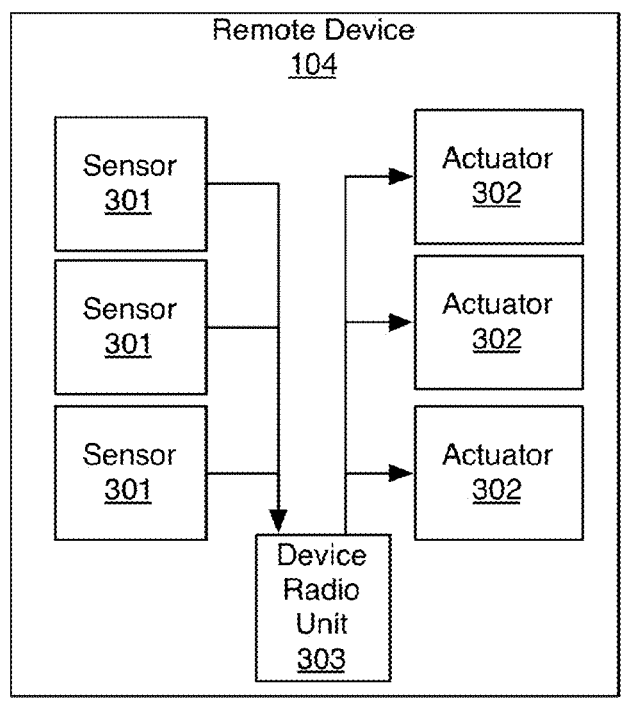
FIG. 3 is a component schematic of embodiments of physical elements of a remote electromechanical device.

FIG. 3 shows a component schematic of an example of remote device [104] illustrating the distinguishing components in the context of the present disclosure. Remote device [104] includes a device radio unit [303] supporting the same communications protocol as the gateway radio unit in the gateway and capable of communicating with the gateway over ranges necessary for the practical placement of the remote device at the remote managed site. Each remote device [104] contains at least one sensor [301], at least one actuator [302], or a combination of both. The sensors and/or actuators collectively provide input and output communications to the device radio unit that enables the monitoring of various data through the sensors and control various settings and indicators through the actuators. While the arrows in FIG. 3 indicate one direction of communication; other examples use two-way communication. For example, the sensor may be queried, and then transmit information; similarly, the actuator may be instructed to change state, and then provide feedback confirming the state change.

Figure 4A:
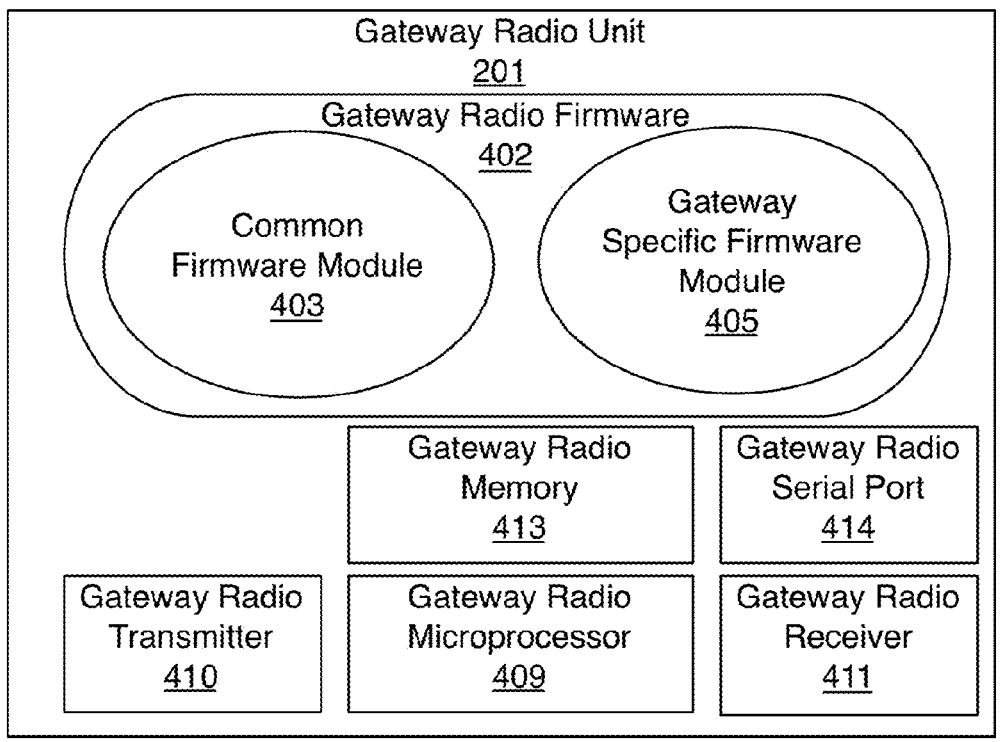
FIG. 4a and FIG. 4b are component schematics of embodiments of the firmware on the gateway radio unit and the device radio unit, respectively.

Referring now to FIG. 4a. Gateway radio unit [201] provides wireless communication to the remote device located at the remote managed site. Gateway radio unit [201] contains a gateway radio microprocessor [409], a gateway radio transmitter [410], and a gateway radio receiver [411], along with an embedded gateway radio firmware [402]. A gateway radio memory [413] may support storage of the control directives, interim data, and the gateway radio firmware. Device radio unit [303], shown in FIG. 4b, contains a device radio microprocessor [406], a device radio transmitter [407], and a device radio receiver [408], along with an embedded device radio firmware [401]. device radio memory [412] may support storage of the control directives, interim data, and the device radio firmware. These components may be physically distinct or they may be integrated together in hardware components. For example, the gateway radio microprocessor and the gateway radio memory may be implemented on a single hardware chip. Similarly, separate receiver and transmitter could be instantiated as a single transceiver.

In one embodiment, the gateway radio unit and the device radio unit may use IEEE 802.15.4 in the 2.4 GHz frequency band to communicate with other such radio units within range. In another embodiment they may use Bluetooth® wireless protocol. In another embodiment, they may use an 802.11 wireless protocol to communicate to them. Any other wireless protocol may be used; particularly those suited to low-power consumption systems.

In another embodiment, some or all of the remote devices communicate with the gateway over a hard-wired connection. This may save on parts and decrease power used by the remote device. The remote device could be charged and/or powered over the wired connection as is common with USB devices.

Yet another embodiment of the present disclosure allows the gateway to perform both its short-range communications to the remote devices and its broadband communications to the data center through the same medium and physical module, such as implementing an 802.11 radio as both the gateway radio unit and the device radio unit.

The remote device may be one of any number of practical devices for monitoring and controlling the systems and environment at the remote managed site. For example, the remote device may be a thermostat, which is controlling an HVAC system. Or it may comprise an electrical circuit load device that is monitoring and controlling the current through a particular electrical circuit. Or it may be a lawn sprinkler control module that is controlling water flow valves and/or monitoring ground moisture.

The firmware components described herein are meant to denote and distinguish logical divisions of functionality for the purposes of elucidating embodiments of the present disclosure and its constituents. In their practical realization, these various firmware components may be implemented in discrete source and binary code packages that are distinct and separable from each other; alternately, multiple such components may be implemented in one or more integrated code packages.

Note that wireless communications may occur directly between the gateway and the remote device, that is "point-to-point", or they may occur in a "meshed network" wherein the gateway and the remote device, with which it is communicating, exchange messages by relaying them through the device radio unit of other remote devices within the remote managed site. Such variations of wireless network configurations, including point-to-point and meshed, as well as others such as "daisy chained", are well known to those skilled in the art of wireless networks. The logistics of establishing the network topology and communication routes, and of relaying wireless messages, are implemented as part of the particular wireless medium and protocols, and are outside the scope of embodiments of the present disclosure and description.

Figure 4B:
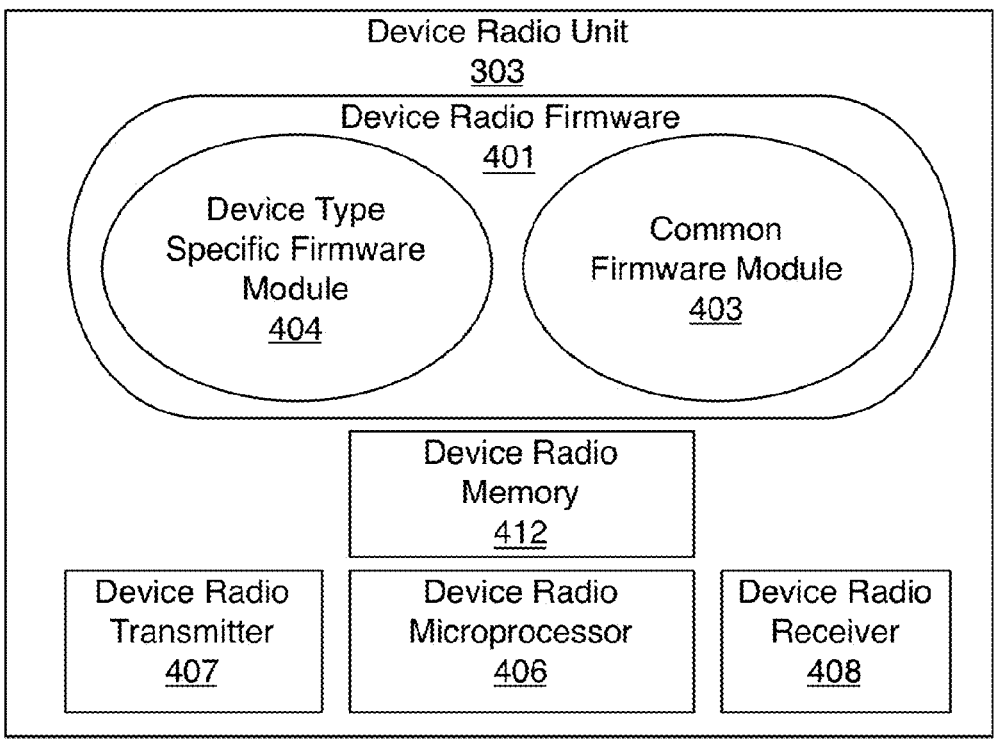

Referencing again FIG. 4a and FIG. 4b, the embedded firmware components of the gateway radio unit and the device radio unit are shown. Each device radio unit [303] contains device radio firmware [401], which executes on its device radio microprocessor [406]. The firmware of the device radio unit is comprised of a common firmware module [403], which is the same on all device radio units [303] and a device type specific firmware module [404], which is unique to the particular type of device that the device radio unit is supporting. The gateway radio firmware of the gateway radio unit is comprised of the common firmware module, along with a gateway specific firmware module [405]. In some embodiments, the common firmware module [403], the gateway specific firmware module [405] and the device specific firmware module [404] represent logical separation of the functionality provided by the computer code. On each device radio unit [303] and gateway radio unit [201], the modules may be deployed as an integral firmware binary package.

Figure 5:
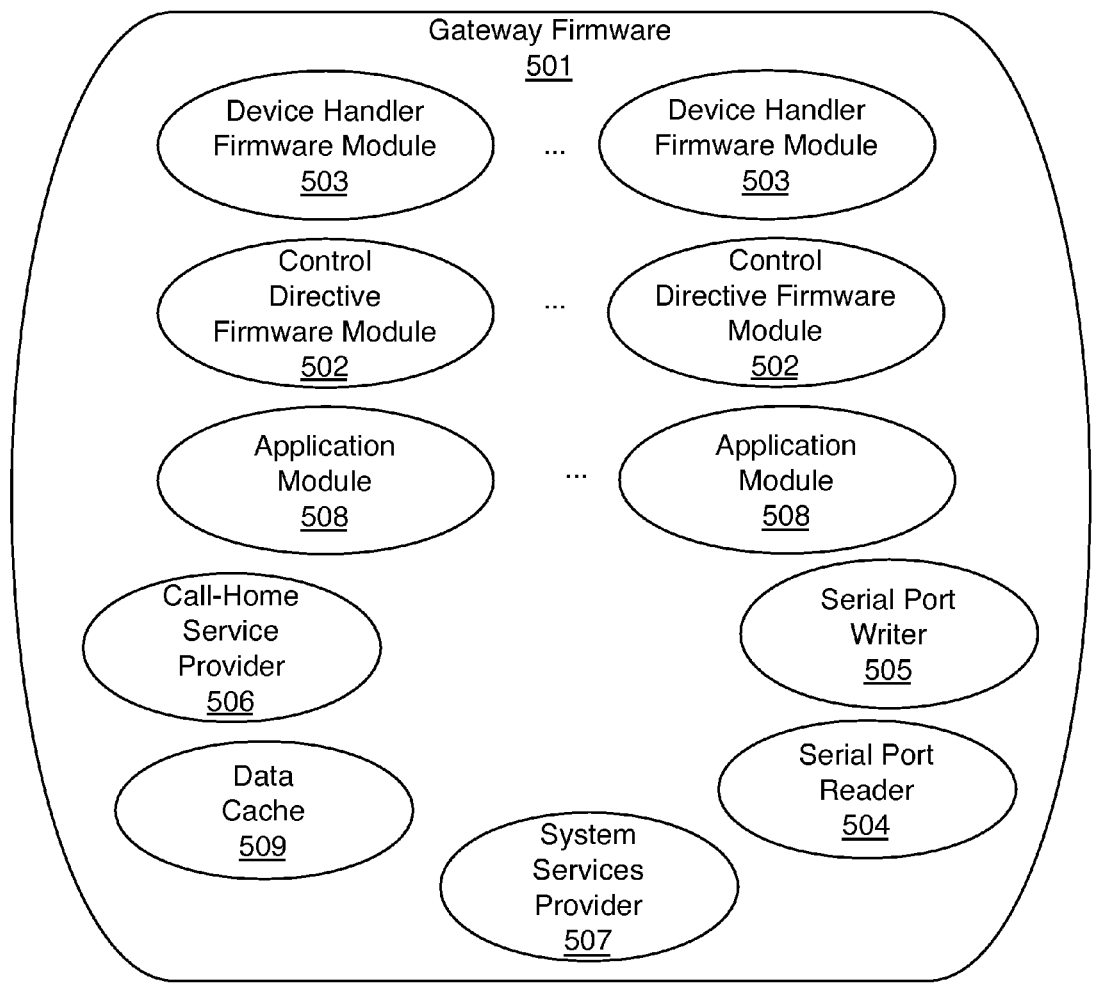
FIG. 5 is a component schematic of embodiments of the software on the gateway.

FIG. 5 shows examples of firmware components of the gateway. The gateway is loaded with a gateway firmware [501], which is executed by the gateway radio microprocessor. It also has a serial port reader [504], a serial port writer [505], a data cache [509], a call-home service provider [506], and a system services provider [507]. Again, these components describe the logical separation of provided functionality; the organization of the source code may be such as to integrate these functions within modules with combined functionality. In the examples shown, the systems services provider is the main coordinating process or thread. It provides the startup and coordination of various services between the modules, and encapsulates for the purposes of this description any other incidental services as may be required by the various modules, besides those which distinguish the invention and which are therefore explicitly described herein. The serial port reader and serial port writer provide functionality to communicate to the gateway radio unit over the serial port [205] indicated in FIG. 2 to the gateway radio serial port [414] shown in FIG. 4a. This functionality includes error checking, retries, configuration of data rates and other serial port parameters known to those skilled in the art. The architecture of embodiments of the present disclosure have stateless communication and as such, data inputs and data outputs are separate concepts with no temporal connection. The data inputs and outputs map to serial read and write operations that operate as separate threads from separate software modules. The data cache allows the gateway to store data between call-home communication exchanges with the data exchange server.

Continuing to refer to FIG. 5 with reference to FIG. 1, for every particular type of remote device [104] that each gateway [103] may manage, a device handler firmware module [503] is included in gateway firmware [501] that provides the device-type specific functionality for managing that device type. Every device handler firmware module [503], regardless of the type of device for which it provides functional support, is implemented to support a specific predefined programming interface. That is, from the perspective of the other modules interacting with it, each device handler firmware module [503] has the same programming interface. By virtue of using a common programming interface, the system is extensible in that additional device handler firmware modules [503], which provide the functionality for new types of the remote devices, can be introduced into systems already deployed at the remote managed sites.

For every control directive type the gateway is expected to support, the gateway firmware includes a corresponding control directive firmware module [502]. Each such control directive firmware module [502] implements the specific functionality required to execute the particular control directive type. These include, for example, control directives for: updating various firmware modules, reconfiguring gateway parameters, setting various firmware parameters on the gateway radio unit and the device radio unit, sending control actions to the actuators on specific remote devices, requesting data samples from the sensors on specific remote devices, reading status of the actuators and configuring the sensors. All such control directive modules implement the same programming interface by which the other modules can invoke its functionality. Thereby, and similar to the device handler firmware module, the system is extensible; additional control directive firmware modules [502] may be introduced into systems already deployed at the remote managed site.

The gateway can receive tasks (via control directives) that can be scheduled for execution at a later time, and it is adapted to store these tasks in the data cache until such time as they are to be executed, and to store also any results of those tasks. The call-home communication exchanges for receiving these tasks and for delivering back any result data are stateless. These capabilities enable the gateway to manage the remote device autonomously. If an attempted communication exchange to the data exchange server at the data center fails for an extended period of time, the gateway continues with its scheduled tasks. It might, for example, change a temperate setting on a thermostat every day at 6:00 a.m. and then back at 9:00 p.m. and it might take temperature readings throughout the day. Each action is performed in response to a previously received control directive, and when a communication exchange to the data exchange server is re-established, the stored response, along with information identifying the source control directive, are transmitted to the data exchange server.

Call-home service provider [506] performs the task of periodically connecting to the data exchange server in order to deliver data from the data cache and receive control and configuration data retrieved from the database. The call-home function and the data exchange communication are described in more detail in relation to FIG. 6.

Gateway firmware [501] may also contain one or more application modules [508]. The application modules may provide additional functionality specific to a embodiments of the present disclosure. For example, the application module might provide the functionality for the system to monitor and control a collection of the remote devices all related to the management of electrical energy consumption at the remote managed site. In this case, the application module may manage scheduled and coordinated programming of heating and cooling systems and large appliances around the remote managed site. Such application modules [508] may interact with any of the other firmware modules in the system. For example, they may be operated upon by various control directive firmware modules [502], or they may access data from the remote devices that is stored in the data cache, or they may issue controls to the remote devices by interacting with the device handler firmware modules.

In the description of operation that follows, hardware components may be described as performing various actions and functions. In such cases, it is understood that the action or function may in fact occur by firmware or software executing on a microprocessor component of the referenced hardware. For example, it may be described that the gateway stores data in its data cache, but this actually occurs by the gateway firmware executing on the gateway microprocessor to realize the action. In this particular context, one can treat the term the gateway and the gateway firmware as equivalent. Similarly, it may be described that the data exchange server performs a particular function, but again it is understood that software executing on the data exchange server actually causes the function to be completed. In the context of the present disclosure, radio firmware and application firmware are presented. Radio firmware is indicated in FIG. 4a (the gateway radio firmware) and FIG. 4b (the device radio firmware). Application firmware is indicated in FIG. 5, (the gateway firmware). Radio firmware is adapted to package and transport messages for communicating between physically separate devices, while application firmware provides and processes the logical content of those messages by which the system interacts with its environment, including users. As has been described previously in reference to FIG. 3, Non-exclusive examples of remote electromechanical device include any sensor, actuator, or the like that provides data to the system and/or is controlled by the system. The gateway provides device control directives to the remote device, types of which include, but are not limited to, thermostats, moisture detectors, rain gauges, valves, solenoids, pressure transducers, lights, pumps, solar panels, furnaces, air conditioners, or blowers. Of these, those that cause an action to occur are examples of actuators; those that allow detection of the system state or environment are examples of sensors. In some examples, the remote device may contain both. For example, a thermostat embodies both sensor [301] that detects the ambient temperature and actuator [302] that turns on the furnace or air conditioner and the blower when the set temperature is reached. A rain gauge embodies sensor [301] that detects the amount of rainfall, but a solenoid that resets the rain gauge embodies actuator [302]. A pressure transducer embodies sensor [301], but a valve that is opened to equalize pressure embodies actuator [302] that the system actuates. A moisture detector embodies sensor [301] and the remote-controlled sprinkler valve embodies actuator [302] that is actuated by the system. The output voltage and current can be detected by sensors [301], and the solar panel moved to point toward the sun by an actuator [302].

The description uses the term "provisioning" to refer to the process of the device radio unit establishing its participation in the local network that is controlled by the gateway radio unit. After this process has occurred, the device is "provisioned", meaning that the device radio unit is able to exchange and interpret communication messages with the gateway radio unit on the local network. This does not mean that the full functionality and operation of the device containing the device radio unit is yet being managed by the gateway on the local network. The description uses the term "commissioning" to refer to the process whereby the remote device exchanges sufficient communications with other components of the overall system to establish itself as a device that is henceforth managed by the gateway. In commissioned mode, the gateway will send control messages to the remote device and the remote device will transmit to the gateway monitored data and other responses to device control directives.

Figure 7A:
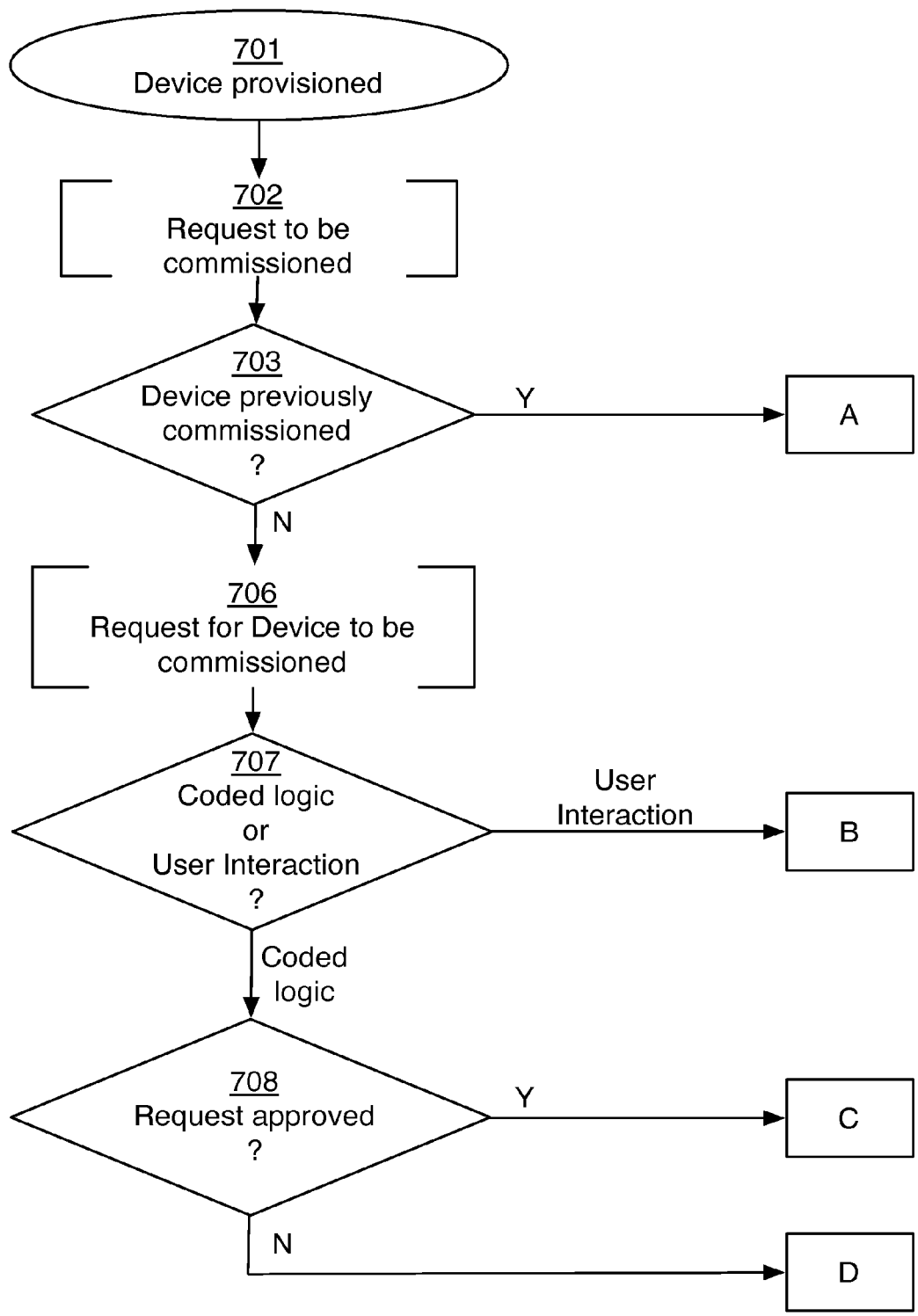
FIG. 7a, FIG. 7b, FIG. 7c are collectively a flowchart of embodiments of the remote device commissioning procedure.
Figure 7B:
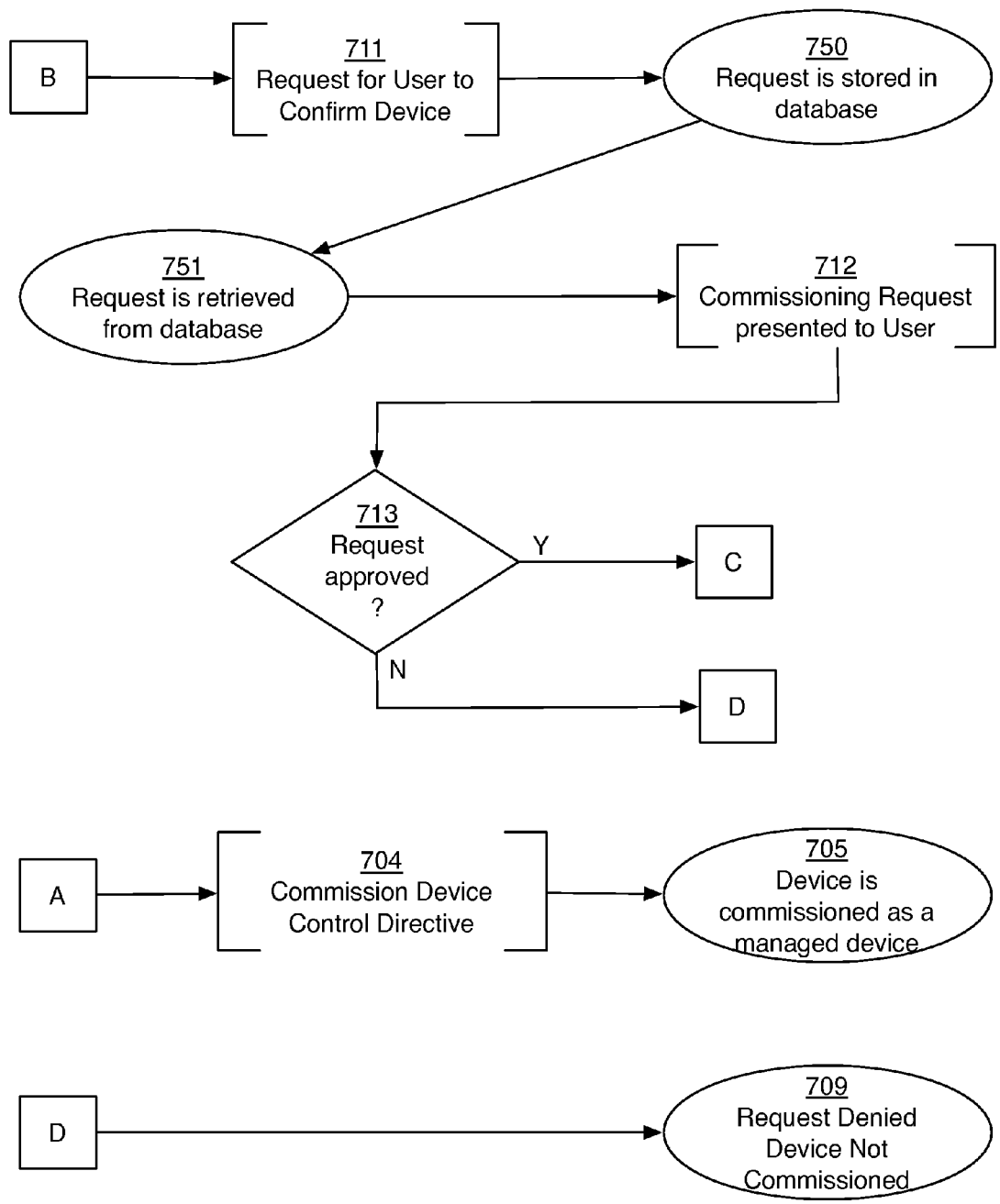
Figure 7C:
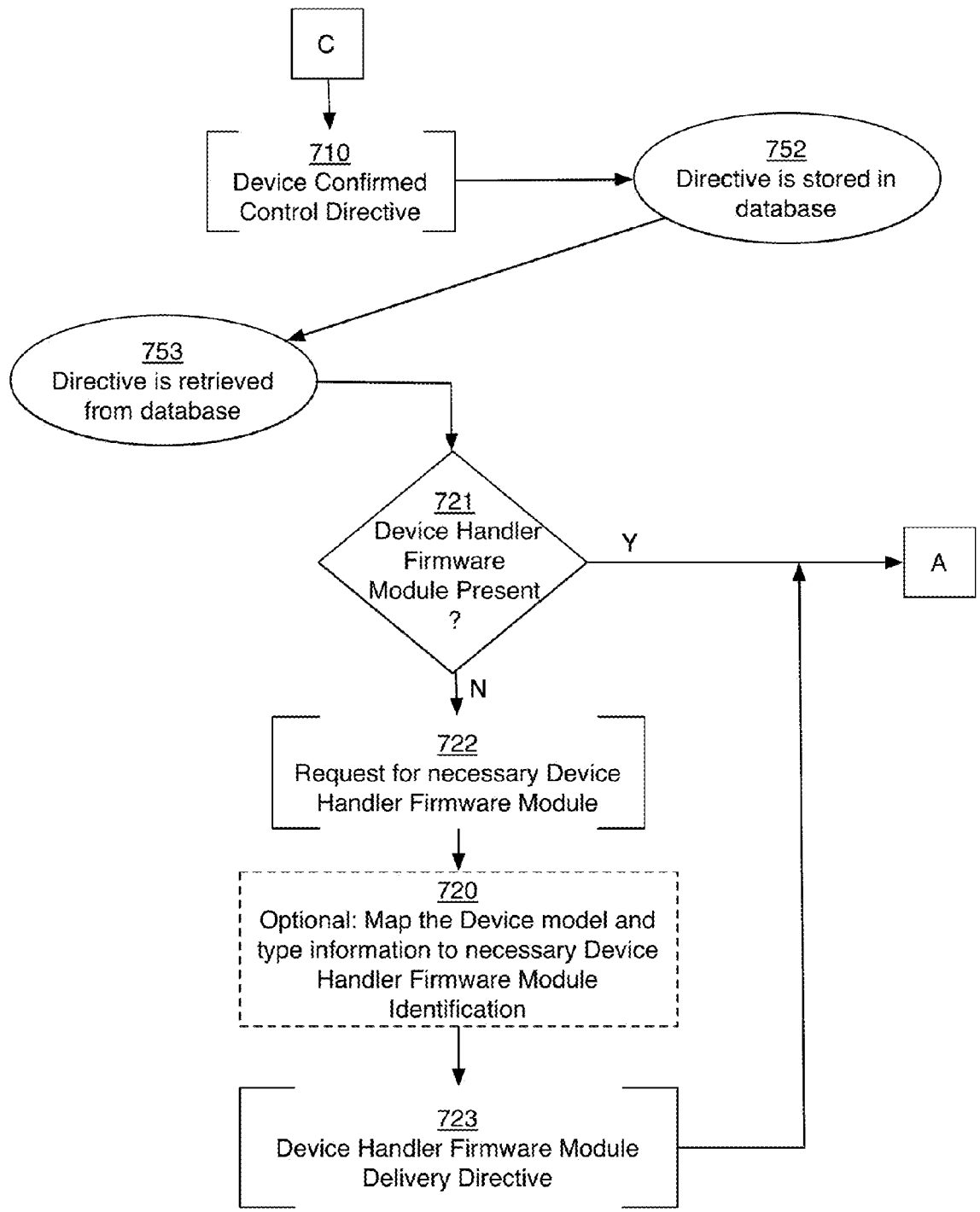

In one example, when the gateway and the remote device are both powered up, the gateway firmware on the gateway, the gateway radio firmware on the gateway radio unit and the device radio firmware on the device radio unit all automatically execute. The gateway radio unit then performs a channel noise characterization procedure, and establishes the local network on a relatively low-noise channel using processes such as those used in 802.15.4/ZigBee® systems, these processes being well known to those skilled in the art of wireless network protocols and implementations. As previously described, the establishment of the remote device as a communicating member of the local network is referred to as "provisioning". In one embodiment, such a provisioning process will involve the following: the gateway radio unit searches for an existing example of the local network with identification parameters compatible with those preconfigured in the gateway radio firmware. If an existing suitable wireless network is found, then the gateway radio unit of this embodiment will take one of two actions depending upon the application for which it has been specifically configured: it will either attempt to join the local network as a router and Internet gateway, or it will record the local network parameters to ensure it maintains separation and avoids network conflict. If the gateway radio unit of this embodiment does not locate an existing example of the local network, or is configured to avoid existing networks, then it establishes a new one, being certain to maintain separation from existing networks. Meanwhile the device radio unit seeks out an established local network to join, and will continue to seek until it finds such a network and joins it. At this point, the remote device is provisioned. Immediately after becoming provisioned, the device radio unit sends a signal to the gateway radio unit indicating its request to be commissioned as a managed device. This commissioning process is discussed in a later section when FIG. 7 is described.

Figure 6:
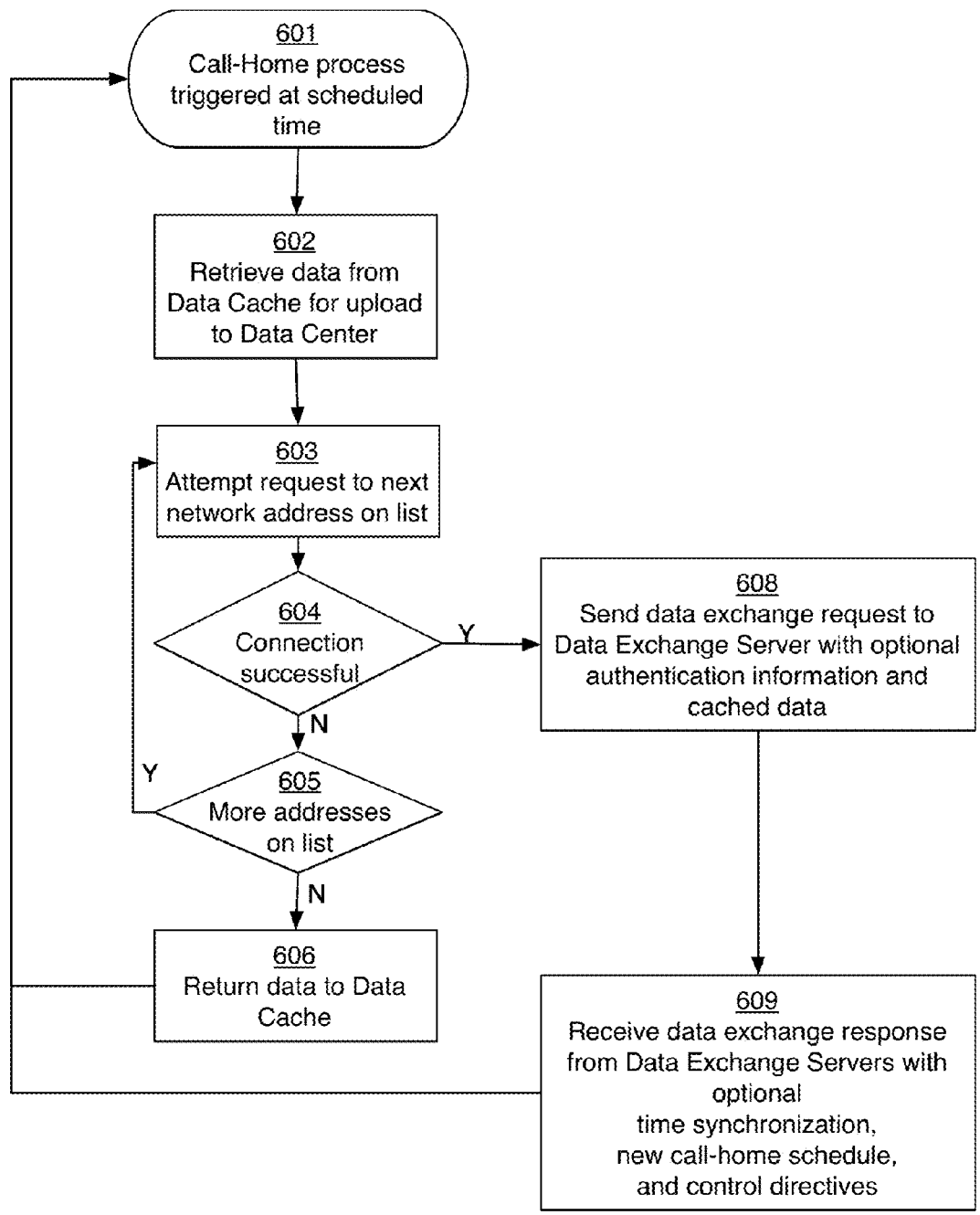
FIG. 6 is a flowchart of embodiments of the call-home communication exchange procedure.

Referring now to FIG. 6, with reference also to FIG. 1, an example of the step-by-step call-home communication exchange between the gateway and the data exchange server is described. Upon powering up, the gateway of this example begins a cycle of initiating the call-home communication exchange with the data exchange server located at the data center.

Each call-home process after power-up is triggered at a scheduled time, starting the process, as shown at [601]. In the step shown at [602], the gateway first retrieves all data from the data cache that is to be delivered to the data center. The gateway holds a list of call-home network addresses for locating the data exchange servers. For example, one embodiment uses the Internet as the broadband communications network and the network addresses would be a Universal Resource Location (URL). In an alternate embodiment, using a modem pool, the call-home list of network addresses would be a list of modem telephone numbers. In the step shown at [603], the gateway attempts to send its call-home request to the first network address on its call-home list of network addresses. If that fails, the gateway will attempt to send its request to the second address, and so on, looping through the steps shown at [604], [605] and [603]. If all the attempts fail, then in the step shown at [606] the gateway will return the data to the data cache, and then in the step shown at [601] wait for a period of time equivalent to its currently configured call-home interval before moving again to the step shown at [602] to repeat these attempts. With all the data that the gateway may be holding for upload to the data center still in the data cache, the gateway continues to execute its other automated management functions, until the call-home communication exchange begins again. This illustrates one method according to the present disclosure that the gateway continues to manage its local environment and maintain data from that environment, even when its connection to the data center is unavailable.

In the example shown in FIG. 6, each successful call-home communication exchange involves the step shown at [608] where the gateway sends its data exchange request including its data payload to the data exchange server through, for example, the broadband communications network. In accomplishing the data exchange, the data exchange server may authenticate the inbound data exchange request from the gateway using procedures such as those commonly used in Internet-based communications and well-known to those skilled in the art. It then processes the incoming data, stores that data directly or in processed form in the database, and retrieves from the database any control directives that have been entered there for delivery to the gateway. The data exchange server then responds to the data exchange request by sending back to the gateway a data exchange response that includes any control directives, along with other configuration data which the gateway receives and processes, in the step shown at [609]. The other configuration data sent to the gateway may include a clock-time for synchronization of the real time clock with that of the data center, and it may include a time interval indicating when the gateway should next initiate a call-home communication exchange. The time interval, if provided by the data exchange server, may be a constant value each time it is delivered, or it may vary depending on rules evaluated by the data exchange server. For example, the time interval may have a normal value of 60 seconds, but it may be dynamically reduced it at any time to a much shorter value such as 5 seconds, in order to cause the gateway to perform call-home communication exchanges at a more frequent rate, thereby reducing the time required to retrieve sampled data from the remote managed site, or to deliver control directives to the gateway after they have been submitted into the database. This might occur when the system detects human interaction through the auxiliary UI application, thereby reducing the response time while the user is interacting with the system. In other cases, such as to reduce server load at peak times, the call-home interval might be increased.

Still referring to FIG. 6 and FIG. 1, sending the cached data in the step shown at [608] may be contingent upon successful authentication for the data exchange request by the data exchange server. The illustrated authentication step allows each side of the communication to verify that the other is part of the legitimate system and that each side is entitled to communicate with the other. Authentication may be accomplished by various means, including use of a pre-shared key, 802.1x certificates, and other methods known to those skilled in the art. While this step is not necessary for operation of the present invention, it does provide a level of security that is important for many applications.

The call-home schedule method presented here is robust and may easily be modified. However, in its simplest form, a call-home schedule could be event-driven, or triggered by a timer. That is, a gateway that is hard-coded to contact the data center every so often has a call-home schedule, albeit without many of the features of embodiments of the present disclosure. An event-driven call-home schedule would move to the step shown at [602] when specific events occur, such as powering up a gateway, or when certain data conditions are met or limits exceeded.

With the use of a call-home schedule that is created from the data center and pushed out to the gateway, a missed call-home event indicates some part of the system is off-line or busy. By recording the actual call-home intervals and comparing these to the scheduled call-home communications, servers in the data center can determine if one or more specific gateway is off-line, or unable to communicate for any reason. Depending on the system configuration, a user may be notified of this situation through e-mail, SMS, Syslog, telephone, or other messaging solution. Correlating missed call-home events from different gateways can be used to analyze systemic issues.

Some examples of the call-home communication exchange between the gateway and the data exchange server may be stateless, at the application level exchanges described herein are stateful in that the system records each control directive submission and is able to correlate responses to the original control directive. By ensuring a response is returned for each control directive, the stateless communication forms a closed-loop and allows stateful operation. The stateful system uniquely identifies each control directive with an identifier and transmits that unique identifier to the gateway along with the control directive. The unique identifier is called a control directive ID. In one embodiment, this is implemented by having a control directive ID field defined in the communication protocol. Each of the gateway responses to a control directive contains the unique identifier in the control directive ID field, so that the response may be mapped to the original control directive. Since each control directive and each response from the gateway contain the unique identifier, the responses from the gateway to various control directives previously delivered to it, can arrive in any order, and the system can still achieve closed-loop communication.

Although a unique control directive and control directive ID could be created for every action the system needs the gateway to perform, in the some embodiments, the system uses a hierarchical control directive ID format to describe the cases when a single control directive is destined for multiple gateways and/or for multiple remote devices on the gateway.

Referring again to FIG. 1. For example, consider a system with many gateways [103] and a user request to query the same information from all the gateways, or to perform the same basic control directive function on all the gateways. In this example, creating a separate, but identical, instance of the control directive for each gateway [103] is not the most efficient method. Instead, a single control directive may be created, but then the control directive ID delivered with it to each gateway [103] may encapsulate two components—one identifying the control directive and the other identifying the particular targeted gateway. This control directive ID, when later referenced within a response from one specific gateway [103], establishes both the control directive that was shared by many gateways, and its particular execution on a particular gateway. A unique identification of a particular gateway may, in one possible example, be based on the gateway's unique MAC address associated with its hardware. Or, alternatively, it may be based on any unique identifier that has been established in association with the gateway during its commissioning. For example, a control directive targeted to three gateways might have a control directive ID of QWERTY, and the MAC addresses of the gateways might be 00:1A:FA:00:01:23, 00:1A:FA:03:42:86, and 00:1A:FA:0D:8E:F9. Concatenating the control directive ID and the MAC addresses creates multiple, unique hierarchical control directive IDs that constituted a unique directive-to-gateway pairing ID: QWERTY/00:1A:FA:00:01:23, QWERTY/00:1A:FA:03:42:86, and QWERTY/00:1A:FA:0D:8E:F9.

In an example when the gateway has multiple commissioned remote devices [104] and the same control directive is to be transmitted to each commissioned remote device. The system could create a unique control directive and control directive ID for every targeted remote device [104] on the local network; in this case, the system would transmit identical control directives multiple times to the gateway, differing only in that they each are destined for application to a different remote device and therefore have a different control directive ID. The gateway would process each control directive independently and transmit the response to each control directive independently.

In an alternate embodiment, a control directive that applies to multiple commissioned remote devices on the local network is created once, and then applied to a particular set of commissioned remote devices. This can be understood by thinking of the multiple commissioned remote devices as an array of devices. The control directive may include, as part of its specification, the identification of the remote device to which it is targeted. The control directive ID, associated with the execution of the control directive for each remote device [104], then encapsulates information identifying both the shared control directive and the remote device. This control directive ID is then referenced in any response resulting from the execution of the control directive, and serves to uniquely identify the shared control directive and its targeted remote device just as if a distinctly separate control directive had actually been created and delivered individually for each remote device. To illustrate this example, a control directive might have a control directive ID of QWERTY. Assuming it is destined for remote devices 1, 3, and 6 on the gateway with MAC ID of 00:1A:FA:00:01:23, we would then have: QWERTY/00:1A:FA:00:01:23/1,3,6.

As previously described, embodiments of the system are stateful, but the communications can be stateless. In the some embodiments, each call-home communication exchange is a "stateless" exchange between the gateway and the data center. That is, any call-home communication exchange can occur independently of when or how the prior call-home communication exchanges occurred. Likewise, the message content transmitted within a particular call-home communication exchange can occur independently of the content of other data exchange communications. The call-home communication exchange may consist of multiple control directives, each with a unique identifier, but the order in which the control directives are transmitted and the order in which they are received does not matter. Any persistence of state relating to the gateway required for subsequent communication exchanges is maintained in the central database and each discrete communication that occurs is catalogued through a unique identifier. Since examples of the central database are accessible by all data exchange servers, there is no need for the call-home request from a gateway to be delivered to any specific data exchange server. The stateless communication exchange consists of a single delivery of a data exchange request, with its data payload to the data exchange server, the processing of that payload by the data exchange server, and a single return data exchange response with its data payload back to the gateway.

Referring now to FIG. 7, the steps involved in commissioning of a remote device are shown in flowchart form. FIG. 7 includes multiple logical flow cases for the commissioning of the remote device. In the first case described, a completely new device is added to the system. The second and third cases describe flows where the remote device was previously commissioned but the device and/or the gateway have lost this information. In the second case, the remote device has lost record of its provisioning status, but the gateway has this data stored. In the third case, both the device and the gateway have lost the provisioning status, but the data center maintains a record that the device has been previously commissioned. The data exchange server is able to process the commissioning request from the gateway and to provide also (in the event of a re-commissioning) the prior state of the remote device, including pending control directives.

Examples of remote devices of the present disclosure can be added to the system dynamically, that is to say they can be added to a system that has already been installed at a remote site without taking the system down.

When a new remote device that has not been previously commissioned to be a managed device is powered up within range of the gateway radio unit, and becomes provisioned on a wireless network, shown at [701], it sends a request as shown at [702] to be commissioned as a managed device to the gateway. The request from the device radio unit includes identification information such as the model and type of the new remote device. The Request may also include authentication (security) credentials and a unique identifier associated with the new remote device. As this is a new remote device, there is no record of previous commissioning, so a decision step shown at [703] leads to the step shown at [706] where the gateway will forward the request to be commissioned to a data exchange server.

In the step shown at [707], the request for device to be commissioned is examined to determine if predetermined coded logic is sufficient to commission the device or if additional user interaction is required. Such user interaction may be required, for example, to confirm the identity of the remote device or to establish a user specified name or description. If no such user interaction is required, then in the step shown at [708], a determination is made whether to approve the request based on predetermined coded logic. If the request is denied, the sequence ends in the step shown at [709]. If approved, a device confirmed control directive, shown at [710], is created and stored in the database in the step shown at [752] for retrieval and delivery to the gateway in a subsequent call-home.

Alternatively, if the user interaction is required at the step shown at [707], a request for the user to confirm the device, shown at [711], is created and stored in the database, shown at [750]. This request is then retrieved from the database in the step shown at [751] and is presented to the user, as shown at [712] when he or she next logs into an auxiliary UI application. At the step shown at [713], if the request is denied, the sequence ends in the step shown at [709]. If approved, a device confirmed control directive, shown at [710], is entered in the database in the step shown at [752] for retrieval and delivery to the gateway in a subsequent call-home.

From this point the flows acquiring confirmation either through coded logic or user interaction that split in the step shown at [707] merge into one flow again. At the next communication with the gateway, the directive is retrieved from the database and delivered to the gateway, as shown at [753]. The gateway then determines if it has available the appropriate device handler firmware module, as shown in step [721]. If so, a commission device control directive is sent to the remote device in the step shown at [704], resulting in the remote device being commissioned as a managed device and the commissioning flow ends in the step shown at [705]. Thereafter, the gateway and remote device will operate in a mode wherein the device is commissioned as a managed device. The gateway will send out various device control directives to the remote device and the remote device will send in monitored data and other responses to the gateway.

Returning to the step shown at [721], if the appropriate device handler firmware module is not present on the gateway then, in the step shown at [722], the gateway sends back to the data exchange server a request for the device handler firmware module. The system determines which device handler firmware module is required in the step shown at [720] and sends this as part of the device handler firmware module delivery directive in the step shown at [723]. The flow continues to the step shown at [704] as described above.

In an alternate flow, a previously commissioned remote device has lost memory of its commissioned status with a particular gateway due to a) the remote device being physically moved out of wireless communication range, b) the remote device losing its power for an extended period, c) having the gateway taken offline for an extended period, or d) the gateway setting up a new wireless network that is different than the one on which the remote device was originally provisioned and commissioned. In this case, when the step shown at [703] occurs, the system, having a persistent record of the commissioned status of this remote device, will transmit a commission-device control directive [704] and the remote device is commissioned.

Commissioning of remote devices within an environment in which there are multiple gateways within wireless communication range of the remote device requesting commissioning requires some additional features. A new remote device may locate and join the first wireless network on which it detects a gateway is communicating, and the remote device will then send a request to be commissioned as a managed device by that gateway. At that point, the gateway will send a request for commissioning to the data exchange server. Note that if this is a previously commissioned remote device, that perhaps rebooted and subsequently attempts to re-join the network through a provisioning step and a commissioning step, then the remote device's original gateway has record of the commissioning status and would have no need to send a commissioning request to the data exchange server. If no response is received approving that commissioning of that remote device by that first gateway within a set time interval, then the remote device will abandon the first wireless network and search for a second wireless network on which a second gateway is communicating. If the remote device finds a second network and is provisioned on that wireless network, it will send a request for commissioning to that gateway. This process continues until the remote device is commissioned or it has located all gateways within communications range and has sent them each a request for provisioning. At this point, the remote device may indicate an error and it may re-attempt commissioning by each gateway after a configurable timeout. This is useful in the event the network connection from the gateway to the data exchange server is down at the time the new remote device is added. Once a remote device has been commissioned, then any other pending requests for commissioning that have been sent to the data exchange server from other gateways are processed by the data exchange server with a commissioning denial message. This alternate flow is not shown in FIG. 7. In response to receipt of a commissioning denial message, a gateway will remove any persistent record of the remote device having requested commissioning. The end result will be that a remote device will succeed in becoming commissioned only to one gateway through which it requested commissioning, that gateway being the one which first delivers a commissioning approval message to the remote device.

With this arrangement, it is possible that one or more remote devices, having requested commissioning through multiple gateways, is accidentally commissioned as a managed device on the local network set up by a gateway different from the one for which it was intended by the user. This would occur, for example, if the remote device has presented commissioning requests to one gateway, and the system is waiting for a user-response to the query presented through the auxiliary UI application. The remote device timeout expires and it presents a commissioning request to a second gateway, where the system waits for a user response to the query presented through an auxiliary UI application. The user (or possibly two different users) could err and make the wrong choice, resulting in the remote device being commissioned to the wrong gateway. This is particularly a problem where the remote device has been commissioned by the wrong user through one auxiliary UI application to which the correct user doesn't have access. To resolve this condition, the invention allows for each type of remote device to support a user-input decommissioning procedure at the physical device. In one embodiment, user-input decommissioning procedure may be specific to the type of remote device. In an alternate embodiment, the user-input decommissioning procedure is similar or identical across all remote devices, providing for a uniform interface. This user-input decommissioning procedure serves the purpose of proving a particular user is the true owner of the remote device (by virtue of physical contact). Executing the user-input decommissioning procedure forces the system to decommission the remote device. Once this is done, the remote device will recommence its search for gateways within communications range. A subsequent request for commissioning from the remote device results in the auxiliary UI application providing the correct owner of the remote device a way to confirm the commissioning request. This process allows a rightful owner of a remote device to reclaim it and establish it as a commissioned device on the correct gateway, after it has been incorrectly or unrightfully commissioned with another gateway within RF communication range. As an example, each Suite A and Suite B in an office building might each have its own gateway and set of remote devices. If the remote device A, owned by the occupants of Suite A, is commissioned by the owner in suite B with gateway B, then the correct owner in Suite A could, in one embodiment, push a button on the remote device A, which will decommission that device. Once this is done, the remote device A begins a standard commissioning procedure.

Some embodiments allow users to interact with auxiliary UI applications to send control directives to the gateway and its commissioned remote devices and to retrieve and view monitored data received from the sensors on the remote devices. The gateway firmware includes control directive firmware modules for each distinct control directive type that is available and each such control directive type is associated with a corresponding control directive type ID. This architecture of a separate control directive firmware module for every control directive type enables embodiments of the present disclosure to easily upgrade, change, or add to the existing control directive types supported. Some control directive types pertain to the gateway and some pertain to the commissioned remote devices. Control directives are processed by a particular gateway, but depending on the particular control directive type, the subject of the processing may be the gateway itself, or it may be related to one of the remote devices being managed by the gateway. Each instance of a control directive submitted by a user is given a unique control directive ID and is recorded in the database along with its directive type ID and the instance parameters associated with that control directive type. The instance parameters define how the control directive is executed and will typically include the identification of the remote device that is the subject of the control directive. Generally, instance parameters include configuration values for the gateway settings (such as the call-home interval) and sensor parameters (such as a sampling rate) and values for control actions to actuators, such as "set temperature at 5:00 PM to 75 degrees." Specifically, control directive types for collecting data from a battery-powered wireless temperature sensor might include instance parameters indicating battery voltage, RF signal strength, temperature, hardware version, firmware version and the like. Other instance parameters would be used for other functions and for other types of remote device. As numerous examples are possible, the parameters described here are not intended to limit the scope of the present disclosure to those described.

The maintenance of unique control directive IDs allows the gateway to process the control directive and return the response information on the outcome to a data exchange server asynchronously during subsequent call-home communication exchanges.

A single control directive instance with particular parameters can be targeted at a collection of gateways, and these gateways could be located at different remote sites. In this case, the original, single control directive and instance parameters are recorded in the database, and also separate unique control directive IDs are recorded for each target gateway. This allows the user to make changes to or gather data from multiple remote sites with a single command. Such a solution is useful when, for example, an aggregate of small systems must respond quickly to a request from a Utility company to decrease the electrical consumption. When each targeted gateway next calls home to a data exchange server, any control directives that have been entered into the database for that gateway are transmitted to the gateway as part of the data exchange server's response. From each gateway's perspective, a control directive targeted at a collection of gateways is indistinguishable from a control directive targeted for just that gateway.

Monitored data received from remote devices may be received in response to a control directive requesting the data sample, or it may be received at the initiation of the firmware on the remote device radio unit, for example a temperature sensor is programmed to measure and upload a reading every 5 minutes. Monitored data also may originate from the gateway itself as various metrics and readings available on the gateway. In all these cases, monitored data is received by the gateway firmware and is first cached locally in the data cache and then uploaded to a data exchange server and stored in the database during the next call-home communication exchange. The database thereby continually accumulates a wide range of monitored data from all remote sites and the devices located there. Auxiliary UI applications may retrieve this data and present it in various forms to the user, including data charts, and email alerts and reports, such presentation forms and services being well known to those skilled in the art.

Updating firmware modules to the gateway and/or remote devices may result in new functionality. For example, a rain gauge might initially be deployed to transmit every time 0.1" of rainfall is recorded. However, a customer who is interested in rain rate may request that the data transmitted be in units of inches per unit time instead of the initial time per each tenth of an inch, and only when the rate exceeds a threshold. Another user may want trending comparisons between sensors. For example, in an irrigation application, some areas under control might receive more rain (or irrigation) than others due to different wind and landscape conditions. The gateway with multiple rain gauges attached and multiple actuators for irrigation control could be programmed to preferably water the areas that have the lowest amount of rain. Additionally or alternatively, there may also be ground-water saturation sensors and the gateway is programmed to preferentially water the dry areas.

As mentioned elsewhere, one aspect of embodiments of the present disclosure is a separate software object for essentially every function the gateway executes. An instruction to execute one of these functions is known as a control directive and the software object that is executed to accomplish the function is a control directive firmware module. With a separate control directive firmware module for each function, any function can be updated independently of another function and a new function can be added at any time without need for updating the entire software image.

The control directive mechanism can also be used to deliver and trigger functionality on the gateway for almost any conceivable purpose. Control directives are defined and control directive firmware modules are developed and deployed for various tasks related to commissioning of remote devices, controlling the remote devices, and retrieving monitored data samples from the remote devices. In one embodiment, a set of control directives are also defined for various configuration and maintenance tasks, including modifying gateway and remote device configuration parameters, requesting hardware and firmware diagnostics reports, updating firmware modules and installing new firmware modules. Note that a task may be a single instruction, such as "read temperature" and it may comprise multiple instructions, such as "read temperature" and "set heater-on threshold to 68 degrees."

Examples of the system include a control directive firmware module that has the function of installing new control directive firmware modules. When control directives are received to update or install a control directive firmware module, this module is executed. It downloads the new firmware from the data center, confirms the validity of the new firmware module, and installs the new control directive firmware module, if necessary. As part of the installation, the gateway updates its internal information with a mapping of the new control directive firmware module to the associated control directive type that, when received, causes this new function to be executed.

Another function of the gateway is installing new device handler firmware modules. A device handler firmware module is similar to a device driver used in personal computers in that the device handler firmware module allows the gateway to "communicate" to devices using standard interfaces, or APIs, between control applications and remote electromechanical devices. The specific device protocol is implemented in the device handler firmware module. The architecture supports a different device handler firmware module for each distinct type of remote electromechanical device.

When the gateway has a new type of remote electromechanical device provisioned, the firmware for that module is identified during the commissioning process as described in the description of FIG. 7. At other times, the server may identify that an update for the firmware module is available and send a device handler firmware module delivery directive. In either case, the device handler firmware module delivery directive contains the new module and the electromechanical device type that this new device handler firmware module controls. As part of the installation, the gateway updates its internal information with a mapping of the new device handler firmware module to the associated control directive type and to the physical remote device.

Other control directives cause the gateway to update the gateway firmware itself, or the gateway radio firmware.

The system also includes gateway firmware that provides system services enabling the gateway to perform various other functions and tasks, such as modifying its configuration parameters, monitoring and detecting regularity of communications with various remote devices, and monitoring the radio network signal health, among other things. If the particular frequency that the gateway has chosen for setting up the wireless network degrades due to changes in the local environment or due to an increase in radio traffic causing interference, the gateway may identify the situation and automatically initiate a re-provisioning of all remote devices onto a new wireless network. In this use case, the gateway could provide a channel switch announcement to the sensors so that they can quickly be re-provisioned to the gateway on the new wireless network. At this point, the devices would all need to be re-commissioned, but the gateway, having a persistent record of both the commissioned status and the data/communication state of its remote devices, will return a confirmation signal to the remote device that it is commissioned without a communication exchange with the data center. This persistent record of the commissioned status would include the unique identification information of the remote device and also any control directive for which a response from the remote device is pending, thereby returning the remote device to its former state.

In an alternate embodiment, if the gateway has also lost the status of a previously commissioned remote device, the gateway can obtain this information during the next communication exchange with the data center. After this communication exchange, the gateway will confirm to the remote device its status as commissioned and also relay any incomplete control directives, thereby returning the remote device to its former state.

Both commissioning and re-commissioning can include authentication, in which the steps of requesting and validating authentication credentials occur after provisioning and before the remote device is commissioned. Authentication credentials can then be used (as is done in 802.1x/802.11i systems) to build an encrypted communication channel.

These re-commissioning use cases apply regardless of how the remote device lost its own record of the commissioned or provisioned state, which might have occurred, for example, due to a reset or battery failure.

Figure 8:
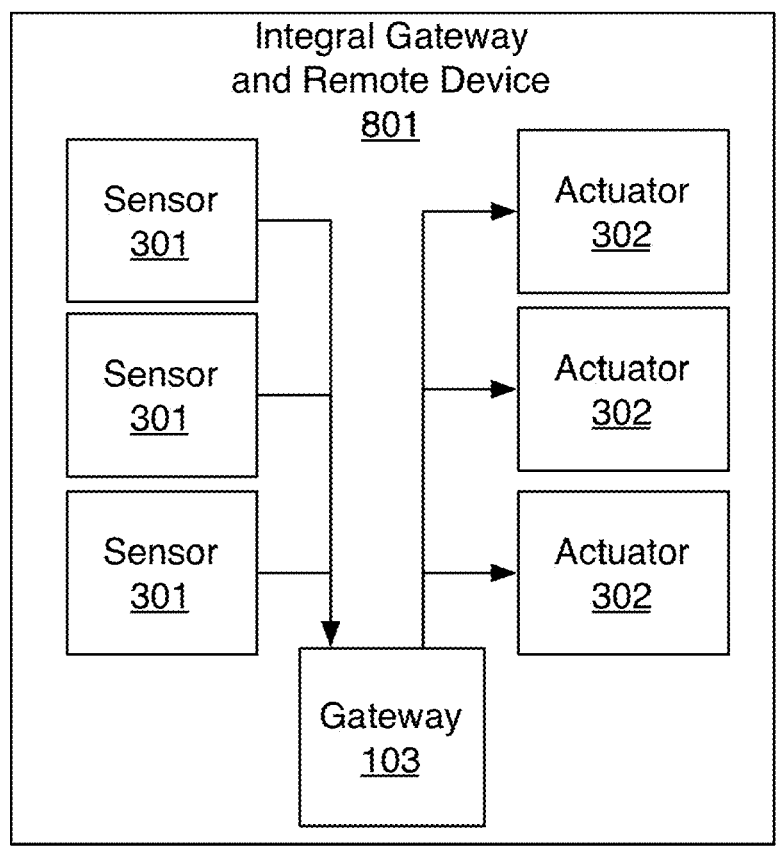
FIG. 8 is a component schematic of embodiments of the integral gateway and remote device.

Referring to FIG. 8, it is shown that the functions of the remote device, sensors [301] and actuators [302], could be integral with hardware for gateway [103] as single unit, creating a combined gateway and remote device [801]. This can be used where only one remote device is needed at the remote managed site or where there is a very common remote device required, such as a thermostat with temperature sensor that controls the HVAC system.

Figure 9:
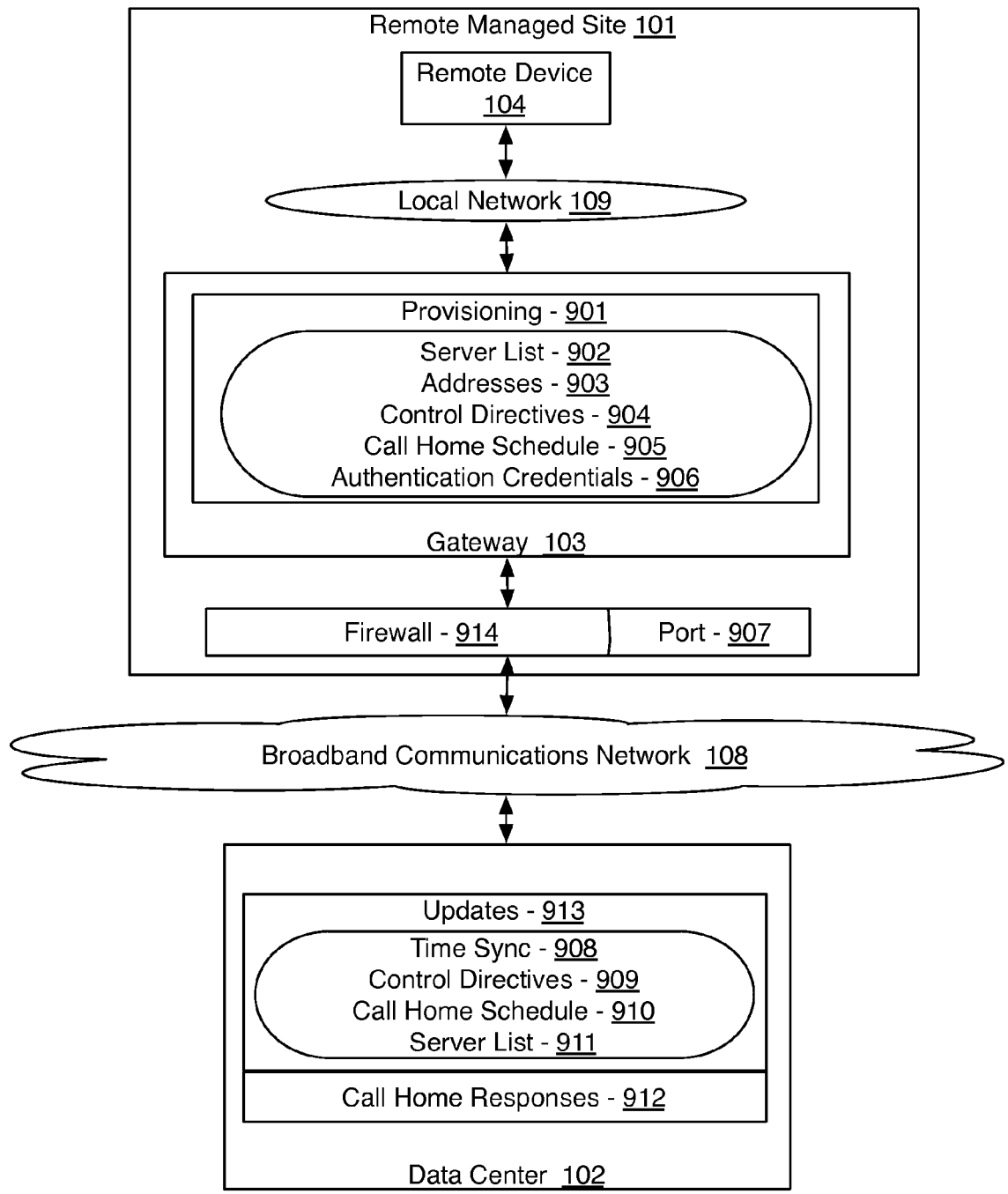
FIG. 9 is a view of embodiments of the system to control a remote managed site from the perspective of software control.

FIG. 9 shows an embodiment of the system to control remote managed site [101] from the perspective of software control. The gateway is provisioned with operating parameters and instructions [901] including at least a server list [902], this list containing addresses of data exchange servers [903] in data center [102] with which to communicate; control directives [904]; a call-home schedule [905]; and authentication credentials [906]. When the call-home schedule indicates it is time to initiate a data exchange communication with the data center [102], the gateway initiates a connection through a firewall [914] using a standard protocol and an open port [907], such as HTTP on port 80. Data center [102] verifies authentication credentials [906] and gateway [103] transmits data, as prescribed by control directives [904] and application modules, that was obtained from remote devices [104] via local network [109]. Responses from data center [102] to gateway [103] are passed through the firewall, so that the data center can respond with updates [913] to operating parameters and instructions, including time synchronization [908], control directives [909], call home schedule [910] and server list [911]. The data exchange server may update call home schedule [910] and server list [911] on a single gateway, a collection of gateways, or all gateways in the network. Load balancing can thus be dynamically implemented by removing a highly loaded server's address from a collection of gateways, or adding a lightly loaded server's address to a collection of gateways. In the same way, by removing one or more servers' addresses from all gateway server lists [902], one or more servers may be updated, moved, or otherwise maintained without affecting the operation of the system. Upon each successful communication exchange from gateway [103], data center [102] may record the call-home time with call-home responses [912].

Figure 10:
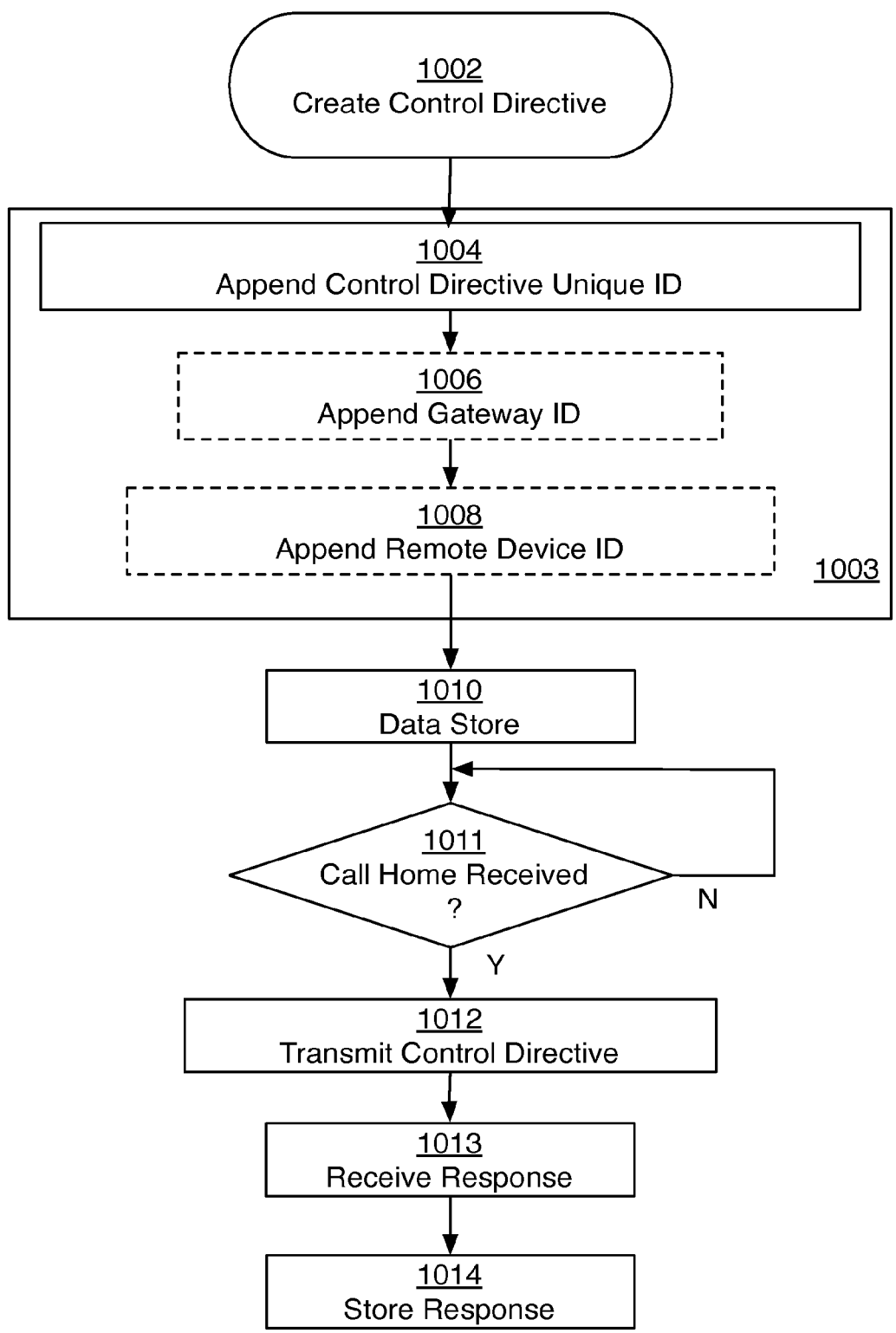
FIG. 10 is a flowchart of embodiments of the system's method for stateless communication

Referring to FIG. 10, where an example of a method for stateless communication is described. When a control or monitoring task is required on the gateway in the remote site a control directive is created by the data center in the step shown at [1002]. In the step shown at [1003], the control directive is paired with a control directive ID. The step shown at [1003] illustrates two examples. In a first example, a separate control directive is created for every task for every gateway. For example, if 10 gateways need the task to be executed, 10 distinct control directives are created and each is paired to a separate control directive ID in the step shown at [1003]. In this case, the steps shown at 1006 and 1008 are omitted, so the step shown at [1003] reduces to the step shown at [1004] where the control directive ID is created.

In a second example where the same task is to be executed at multiple remote sites, a single control directive is created and in the step shown at [1004] it is mapped to one control directive ID. That one control directive ID is then extended by each of the 10 gateway IDs, creating 10 control directive IDs. This can be accomplished, for example, by appending a unique gateway ID to a single control directive ID in the step shown at [1006]. The step shown at [1008] continues this process at the next level for each sensor attached to each of the gateways and appends a remote device ID to the output of the step shown at [1006], making a hierarchical control directive ID, such as: controlDirectiveID/gatewayID/remoteDeviceID.

Once the control directive ID is created, it is stored along with the control directive in step [1010], typically in a database (not shown in FIG. 10). The data exchange communication is initiated from a remote site, step [1011]. After a data exchange request is received from the targeted gateway in step [1011], the control directive, along with the control directive ID, is transmitted to the gateway in Step [1012]. When the response is received in step [1013], it includes the control directive ID [1004] allowing the response to be mapped to the original control directive [1001], independent of the time of response, order of response, gateway, remote device or data exchange server involved in the creation of the control directive, fulfillment of the control directive, or receipt of response to the control directive. As such, when the response is stored in step [1014], the full state of the data transaction is known, even though the communication itself was stateless.

This invention provides an economical and scalable platform that can automate the control and monitoring of various electromechanical devices, while at the same time providing a convenient interface to a site manager. It is also designed to provide an interface for managers of multiple sites to remotely monitor and control an aggregated collection of devices across the multiple sites.

The invention has several distinct advantages over other systems being used to monitor and control such systems. It leverages an existing wide-area two-way communications infrastructure; in one embodiment this would be the Internet, which is prevalent throughout the United States and many other countries. In other embodiments, this may occur through a cellular phone network. The invention also uses stateless gateway-initiated communications between the remote managed sites and their common data center. This means that it is not necessary for the data exchange server to initiate communication exchanges with the remote gateway, or to navigate through security firewalls to do so. Consequently the system can be deployed into a very large number of installations, without requiring customized installation and configuration to overcome very common TCP/IP firewall issues that exist in prior art. It only requires the gateway to be able to communicate through standard communications ports that are present and accessible from the vast majority of residential and small-site broadband local area networks. Specifically, using the standard HTTP protocol allows a device inside the firewall to initiate data communication and the firewall allows an HTTP response from outside the firewall. Using the standard HTTPS protocol provides the same benefits, with a secure protocol that prevents man-in-the-middle attacks. These connection methods can be used on their standard ports (port 80 for HTTP and port 443 for HTTPS) although any typically open port may be used with the same benefits.

Unlike other systems which transmit control and monitoring directly between remote devices and a central control center using a long range communications medium, or which use a gateway device at the remote site to simply relay control and monitoring signals between remote devices and a central control center, embodiments of the present disclosure uses a gateway with sufficient memory and processing resources to enable much of the intelligence for ongoing management of the remote devices to reside on the gateway. Combined with stateless communication and stateful operation, the system can continue to operate, even while connectivity between the remote managed site and the data center may be unavailable for extended periods. The gateway is able to hold all of the pre-scheduled programming of the remote devices and continue to process control directives to the remote devices and to receive and cache monitored data from the remote devices. When the connectivity to the data center is restored, this cached data may be uploaded to the database without loss, and additional control directives that have been queued up in the database while the connectivity was unavailable, are then delivered to the gateway for processing.

Another advantage of the invention over previous systems is that remote devices of an entirely new type can be developed and introduced into existing installed remote managed sites.

The modular approach to the hardware and firmware components of the invention enables adding new devices into existing installed remote managed sites. A new remote device can be developed and outfitted with device specific firmware on its device radio unit. This remote device can then be deployed physically at an existing site. When this new remote device type is powered up and proceeds through the commissioning process, a device handler firmware module can be requested by the gateway and delivered to the gateway during call-home data exchange communication between the gateway and the data exchange server. Upon receiving the device handler firmware module, the gateway is able to load it into memory and henceforth actively control and monitor the new remote device type. This device handler firmware module provides all functionality that is peculiar to the type and model of device being managed.

Control directives that are sent to the gateway and executed on the gateway are also dynamically extensible and updatable by delivering new or updated versions of the control directive firmware modules. New physical devices being added to the family of devices that can be managed, or new functional requirements, may necessitate the definition and development of new control directive firmware modules. These are also implemented according to a specific predefined programming interface and can then be delivered dynamically to the gateway during any one of its call-home data exchange communication. The functionality of that control directive type is then available to the gateway for managing itself and its network of managed devices.

Multiple data exchange servers may be deployed at the data center, in order to distribute the load produced by large numbers of gateways calling home, and to provide redundancy in the case of a failure or planned maintenance of one of the data exchange servers. This can be accomplished through the deployment at the data center of load balancing devices and procedures that are familiar to those skilled in the art of Internet networking systems. The present invention, however, has the advantage of being able to achieve both load balancing and redundancy without the use of additional hardware at the data center. Moreover, with the present invention, this load balancing and redundancy can be dynamically configured through the auxiliary UI applications. Redundancy is achieved through the gateway's use of a list of server addresses to use when performing call-home communication exchanges. If, during a particular call-home procedure, the gateway fails to connect to a data exchange server on its server address list (also called its server list), it tries the next one, and so on. Load balancing is achieved by delivering control directives to a collection of gateways that reset the gateways' server address lists to use for call-home data exchange communication. In this way, different subsets of gateway installations can be directed to call-home to particular data-exchange servers. In the event a server goes off-line, other servers may update the server list provided to the gateways at the next call-home data exchange communication. A gateway whose first option was to contact the server that is off-line will subsequently try in order the other servers on its list. The new server list will therefore be delivered to the gateway by way of one of these other servers in the gateway's existing server list. Additionally, a gateway could modify its own server list by moving a non-responsive server from the list or to a lower priority location in its server list.

It may be that all gateways produce about the same load on a data exchange server and that each data exchange server is similar in its hardware resources and capacity to serve requests. In this case, a distribution of servers across the server lists, for a collection of gateways, that results in each server supporting, on average, the same number of gateways would be reasonable. If, however, some gateways produce a higher load, or if some data exchange servers can manage less load than others, then some servers may be closer to their capacity load than others. A load-balancing algorithm might put a few high load gateways on one server and many low-load gateways on another server, or the high-load gateways might be distributed evenly across the servers. Such an algorithm may also take into consideration different capacities of different servers. Whatever the algorithm, a server's load may be adjusted by selectively populating the server list on the gateways. In a similar fashion, if a data exchange server is to be taken down for servicing, its entry could be removed from the server list on every gateway in the network prior to the service event, then re-populated after the service event. Or the server lists may already be setup to allow sufficient failover to other servers on the list that are not being taken down. In addition, server load can be decreased by increasing the interval between call-homes from the gateways communicating with a particular server. If a fast response time is important, as may be the case when a user logs on and is actively interacting with the system, or when certain devices are added to a particular remote site, or where the remote site is for any reason designated to be of a higher service priority than others, the interval can be decreased at the expense of higher server load. This, in combination with adjusting the server list on the gateway, can balance response time and server load across the entire network.

For mission-critical sites, there may exist redundant gateways. For example, there may be two gateways, each with a different network path to the data center. Specifically, one gateway might have a LAN uplink and a second gateway at the same site might have a WAN (such as 3G) uplink. Or, one gateway might have a different power source than the other to supply redundancy on power supply. The data center would then send control directives for each remote device to both gateways. In one embodiment of this scenario, one gateway serves as the primary gateway to which the remote devices preferentially connect and the other serve as a redundant gateway and the redundant gateway has the identical network configuration for controlling remote devices as does the primary gateway. In normal operation, the redundant gateway operates in a passive mode simply calling-home to the data center and monitoring the status of the primary gateway. If it fails to sense an appropriate heartbeat from the primary gateway, or if it receives a specific control directive from the data center, then it assumes the role of primary gateway. The heartbeat mechanism could be implemented in several ways. The redundant gateway could be provided access to communicate directly on the broadband network to the primary gateway and could then monitor or query status on it. Or it could be provisioned as a node on the primary gateway's wireless network and receive wireless heartbeat messages from the primary gateway. Or it could simply communicate with the data center waiting for a control directive to take over as the primary gateway. Other mechanisms are also possible for the redundant gateway to be triggered to take over as the primary gateway.

To provide redundancy only on the communication link to the data center, a gateway could have multiple uplinks, such as an Ethernet and a 3G uplink.

The invention also has the advantage that an entire data center can be effectively relocated without physically accessing the population of remote sites that are communicating with it and without extended loss of communications or data or control functionality. This is achieved also through the use of the gateways' server lists. Prior to relocating the data center, all gateways can be configured, through the delivery of control directives, to use a list of addresses which includes the data exchange server addresses at the original data center followed by those that will be valid for the new data center. The original data center can then be taken offline, preferably after bringing the new data center online. When the original data center is taken offline, each gateway will, during its next communication attempt, experience a failure to connect to the data exchange server addresses at that location. The gateway will then attempt the other addresses on its list, eventually coming to that of the data exchange server address of the new data center location. At that time the gateway will succeed in connecting to the new data exchange servers at the new data center. If the new data center is not already online, the gateway will continue cycling through its list of data exchange servers during subsequent call-home attempts and will connect to the new data exchange servers at the new data center once the data center is brought online This strategy can also be applied to upgrades, replacements, and additions of data exchange servers within a single data center. For additions, one or more new data exchange servers are added to the data center and the addresses of these new data exchange servers are provided to the gateways. For replacements, the old servers may then be removed. For upgrades, the original servers can be taken off-line and upgraded, then returned to service in the data center and the "new" data exchange servers subsequently removed. Since the data center has server redundancy and load balancing, it is possible to replace or upgrade a subset of the servers without detrimental impact to the system.

The invention also has the benefit of providing certain "auto-confirmation" actions for the commissioning of remote devices that minimize unnecessary interactions with an end user. One such scenario is when a remote device may become temporarily disconnected from the wireless network for various reasons. This may occur, for example, when local radio noise interferes with the wireless messages, or when the remote device suffers a temporary power loss or is manually removed and then replaced during which intervening time the wireless network parameters are changed due to the gateway implementing a re-provisioning of the wireless network. In such cases the remote device will relocate and re-provision to the new wireless network and then communicate with the gateway, requesting to be re-commissioned as a managed device. But since the remote device has already been commissioned in the past and so has already been confirmed and accepted by a user through an auxiliary UI application, it is therefore unnecessary for the request from the remote device to once again be retransmitted up through the gateway to the data exchange server and to the database for presentation to a user. Instead, the remote device is auto-confirmed at the point when the message reaches the gateway. The gateway firmware establishes that the remote device is known and already approved as a managed device, so it simply sends a message back to the remote device confirming its commissioning and possibly restoring any state information known from its previous participation on the network.

A similar auto-confirmation is available when a request to be commissioned reaches the data center during a call-home. For example, consider a situation where a remote device has been confirmed and commissioned as a managed device, and then the gateway for any reason loses its persistent memory record of the remote device. The remote device will locate the gateway and send a new request to be commissioned, but the gateway will not have any record of it being previously commissioned. It will therefore send the request on up to the data exchange server during the next call-home communication exchange. The data exchange server will find that the remote device has been previously commissioned and will return a device-confirmed directive to the gateway. There is no need to re-present the request to an end-user through an auxiliary UI application before doing so.

To further clarify the present invention, we present a sample application. This sample does not in any way intend to limit the scope of the invention, merely to help describe how it may be used. One very useful application of embodiments of the present disclosure is for the remote management of energy usage at a small-commercial site or residence, both by homeowners and small-site managers as well as by power utility operators. In this application, the remote devices include such devices as electric meters measuring the whole-site energy supply, thermostats which control heating, ventilation, and air conditioning (HVAC) systems, load control devices which may control (and monitor) the electrical energy supply to appliances such as pool pumps or hot water heaters, lighting control devices, and many others. The gateway firmware includes functionality as previously described herein for the basic provisioning, commissioning, maintenance of the system, but it may also include functionality for both scheduled and event-triggered response control of the various energy devices. Monitored data delivered to the database at the data center and accessed through auxiliary UI applications can include high resolution time histories of the energy usage and operational states of all these devices. For example, a user may view, within an auxiliary UI application, time history reports of such things as the ambient temperatures at the site, operational status of heating and cooling systems, electrical energy consumption over time, as well as event histories of such details as when a user interacts with a thermostat to override its settings, or to dim lights. Control directives, specific to this application, can provide such functionality as modifying the scheduled programming the HVAC systems, or setting back the control settings on thermostats to override the scheduled programming during times of low energy supply or high energy cost, to conserve energy.

Another example application of embodiments of the present disclosure is for the remote management of lawn and gardens at a site. In this example, the remote devices include such devices as environmental sensors for temperature, humidity, ground moisture, or sunlight, hydraulic sprinkler control devices, fertilizer dispensers, and air circulation fans. The application-specific functionality of the gateway may include the automatic analysis of environmental conditions and the triggering of water sprinklers and fertilizer dispensers.

This disclosure may include one or more independent or interdependent inventions directed to various combinations of features, functions, elements, and/or properties. While examples of apparatus and methods are particularly shown and described, many variations may be made therein. Various combinations and sub-combinations of features, functions, elements, and/or properties may be claimed in one or more related applications. Such variations, whether they are directed to different combinations or the same combinations, whether different, broader, narrower, or equal in scope, are regarded as included within the subject matter of the present disclosure.

The described examples are illustrative and directed to specific examples of apparatus and/or methods rather than a specific invention, and no single feature or element, or combination thereof, is essential to all possible combinations. Thus, any one of the various inventions that may be claimed based on the disclosed example or examples does not necessarily encompass all or any of particular features, characteristics, or combinations unless subsequently specifically claimed. Where "a" or "a first" element of equivalent thereof is recited, such usage includes one or more such elements, neither requiring nor excluding two or more such elements. Further, ordinal indicators, such as first, second, or third, for identified elements are used to distinguish between the elements and do not indicate a required or limited number of such elements, and do not indicate a particular position or order of such elements unless otherwise specifically indicated.

We claim:

1. A system for two-way communication between a data center and a first electromechanical device and a second electromechanical device that are located at a remote site, the system comprising:
   a first device firmware disposed within the first electromechanical device, the first device firmware being adapted to receive and process device control directives;
   a second device firmware disposed within the second electromechanical device, the second device firmware being adapted to receive and process device control directives;
   a gateway disposed at the remote site, the gateway including a gateway firmware in communication with the device firmware and adapted to initiate a plurality of data exchange communications with the data center, each data exchange communication executed according to a call-home schedule and including a data exchange request transmitted from the gateway and a data exchange response transmitted from the data center, the data exchange response including a control directive received from the data center, each data exchange communication adapted to be closed immediately upon receipt of the corresponding data exchange response, wherein the gateway firmware is further adapted to derive a device control directive from the control directive and transmit the device control directive to at least one of the electromechanical devices, the plurality of data exchange communications including:
      a first data exchange communication including a first data exchange request transmitted from the gateway and a first data exchange response transmitted from the data center, the first data exchange response including a first control directive received from the data center, and
      a second data exchange communication including a second data exchange request transmitted from the gateway and a second data exchange response transmitted from the data center, the second data exchange response including a second control directive received from the data center,
      wherein the gateway firmware is adapted to derive a first device control directive from the first control directive and transmit the first device control directive to the first electromechanical device and to derive a second device control directive from the second control directive and transmit the second device control directive to the second electromechanical device; and
   a server hosted on the data center, the server in communication with the gateway firmware and adapted to respond to the plurality of data exchange communications, adapted to determine the call home schedule, and adapted to create the control directives and transmit the data exchange response including the control directives and the call home schedule to the gateway.

2. The system as set forth in claim 1, wherein:
   the first device firmware is adapted to process the first device control directive by measuring and storing one or more data and is adapted to transmit the one or more data to the gateway firmware; and
   the gateway firmware is adapted to receive the one or more data transmitted from the device firmware and transmit the one or more data to the data center in a third data exchange request.

3. The system as set forth in claim 2, wherein the gateway firmware is adapted to store at least one of the one or more data.

4. The system as set forth in claim 2, wherein the call-home schedule includes one or more events that relate to a condition of the one or more measurement data.

5. The system as set forth in claim 1, where the first device firmware is also adapted to actuate an actuator defined by the first device control directive.

6. The system as set forth in claim 1, wherein the server is in communication with the gateway over a broadband network, and where the data exchange communication is transmitted using TCP/IP and a standard open port.

7. The system as set forth in claim 1, further comprising:
   a plurality of gateways including a first gateway disposed within a first remote site and a second gateway disposed within a second remote site; and
   a plurality of servers hosted on a plurality of data centers including a first server and a second server,
   the first server adapted to at least one of:
      communicate with the first gateway,
      host a first central database, and
      support first auxiliary user interface applications that enable creation of control directives, and
   the second server adapted to at least one of:
      communicate with the second gateway,
      host a second central database, and
      support second auxiliary user interface applications that enable creation of control directives.

8. The system as set forth in claim 1, wherein the gateway firmware is adapted to create, manage, and maintain a local network by which the gateway is adapted to communicate with each device firmware.

9. The system as set forth in claim 1, wherein the gateway firmware is adapted to provision the first electromechanical device with authentication credentials.

10. The system as set forth in claim 1, wherein the control directives are selected from a set of control directive types, the gateway firmware contains one or more control directive firmware modules, each of the control directive firmware modules being adapted to execute the function of a corresponding one of the set of control directives types.

11. The system as set forth in claim 10, wherein the gateway firmware, in response to receiving a third control directive, is adapted to receive and deploy an updated control directive firmware module.

12. The system as set forth in claim 1, wherein each electromechanical device corresponds to one of a plurality of electromechanical device types, wherein the gateway firmware contains a plurality of device handler firmware modules, each device handler firmware module corresponding to one electromechanical device type of the plurality of electromechanical device types, each device handler firmware module adapted to manage and control each electromechanical device of the corresponding electromechanical device type.

13. The system as set forth in claim 1, wherein the at least one gateway and the first electromechanical device are integral.

14. A system as set forth in claim 1, comprising two gateways disposed within the remote site wherein a first gateway includes a first gateway firmware in communication with the first device firmware and the second device firmware, and a second gateway includes a second gateway firmware in communication with the first device firmware and the second device firmware, the first gateway and the second gateway being adapted to collectively transition between:
    a first state in which the first gateway firmware is adapted to initiate the plurality of data exchange communications with the data center, and adapted to derive the device control directives and transfer the device control directives to the electromechanical devices, and
    a second state in which the second gateway is adapted to initiate the plurality of data exchange communications with the data center, and adapted to derive the device control directives and transfer the device control directives to the electromechanical devices.

15. The system as set forth in claim 1, wherein the call-home schedule includes a time interval transmitted from the data center to the gateway as part of at least one data exchange response.

16. The system as set forth in claim 1, wherein the server is adapted to identify a missed call-home event and to notify a user of the missed call-home event.

17. The system as set forth in claim 1, wherein at least one data exchange response also includes time synchronization information, a new call-home schedule, and a server list.

18. A gateway adapted to provide two-way communications between a data center and a first electromechanical device and a second electromechanical device that are located at a remote site, the gateway comprising:
    a device communications unit adapted to transmit a first device control directive to the first electromechanical device and a second device control directive to the second electromechanical device;
    a server communications unit adapted to transmit a first data exchange request to the server and to receive a first data exchange response including a first control directive and a second data exchange request to the data center and to receive a second data exchange response including a second control directive, and
    a gateway firmware operatively connected to the device communications unit and the server communications unit, the gateway firmware adapted to initiate a plurality of first and second data exchange communications with the data center, each data exchange communication executed according to a call-home schedule, the first data exchange communication including the first data exchange request and the first data exchange response and the second data exchange communication including the second data exchange request and the second data response, each data exchange communication adapted to be closed immediately upon receipt of the associated data exchange response, wherein the gateway firmware is further adapted to derive the first device control directive from the first control directive, to transmit the first device control directive to the first electromechanical device, to derive the second device control directive from the second control directive, and to transmit the second device control directive to the second electromechanical device, wherein the call-home schedule includes a time interval transmitted from the data center to the gateway as part of at least one data exchange response.

19. The gateway as set forth in claim 18, wherein the gateway firmware is adapted to receive one or more data from the first device firmware and transmit the one or more data in a third data exchange request.

20. The gateway as set forth in claim 19, wherein the gateway firmware is adapted to store at least one of the one or more data.

21. The gateway as set forth in claim 19, wherein the call-home schedule includes one or more events that relate to a condition of the one or more data.

22. The gateway as set forth in claim 18, wherein the gateway firmware interfaces with a broadband network, and where the data exchange communications are transmitted using TCP/IP and a standard open port.

23. The gateway as set forth in claim 18, wherein the gateway firmware is adapted to create, manage, and maintain a local network that interfaces with the device communication unit.

24. The gateway as set forth in claim 18, wherein the gateway firmware is adapted to provision the first electromechanical device with authentication credentials.

25. The gateway as set forth in claim 18, wherein the control directives are selected from a set of control directive types, the gateway firmware contains one or more control directive firmware modules, each of the control directive firmware modules being adapted to execute a function of a corresponding one of the set of control directives types.

26. The gateway as set forth in claim 25, wherein the gateway firmware, in response to receiving the control directive, is adapted to receive and deploy an updated control directive firmware module.

27. The gateway as set forth in claim 18, wherein each electromechanical device corresponds to one of a plurality of electromechanical device types,
    wherein the gateway firmware contains a plurality of device handler firmware modules, each device handler firmware module corresponding to one electromechanical device type of the plurality of electromechanical device types, each device handler firmware module adapted to manage and control each electromechanical device of the corresponding electromechanical device type.

28. A gateway as set forth in claim 18, comprising two gateway modules within the remote site wherein a first gateway module includes a first gateway firmware and first device communications unit, and a second gateway module includes a second gateway firmware and second device communications unit, the first gateway module and the second gateway module being adapted to collectively transition between:
- a first state in which the first gateway firmware is adapted to initiate the plurality of data exchange communications with the data center, and adapted to derive the first and second device control directives and transfer the first and second device control directives to the electromechanical devices, and
- a second state in which the second gateway firmware is adapted to initiate the plurality of data exchange communications with the data center, and adapted to derive the first and second device control directives and transfer the first and second device control directives to the electromechanical devices.

29. The gateway as set forth in claim 18, wherein each data exchange response also includes time synchronization information, a new call-home schedule, and a server list.

30. A system for two-way communications between a data center and an electromechanical device that is located at a remote site, the system comprising:
- a device firmware disposed within the electromechanical device, the device firmware adapted to receive and process device control directives; and
- a gateway disposed at the remote site, the gateway including a gateway firmware in communication with the device firmware and adapted to initiate data exchange communications with the data center according to a call-home schedule, the data exchange communications each comprising a first data exchange communication including a first data exchange request transmitted from the gateway and a first data exchange response with a first control directive and a first control directive ID associated with the first control directive received from the data center and a second data exchange communication including a second data exchange request transmitted from the gateway and a second data exchange response received from the data center, each data exchange communication adapted to be closed immediately upon receipt of the associated data exchange response with the first data exchange communication being closed upon receipt of the first data exchange response prior to initiating the second data exchange communication, wherein:
  - the gateway firmware is further adapted to derive a first device control directive from the first control directive and transmit the first device control directive to the electromechanical device,
  - the device firmware is further adapted to process the first device control directive by measuring and storing one or more data and transmitting the one or more data to the gateway firmware, and
  - the gateway firmware is further adapted to receive the one or more data transmitted from the device firmware and include the first control directive ID and the one or more data within the second data exchange request,
  - wherein the call-home schedule includes a time interval transmitted from the data center to the gateway as part of at least one data exchange response.

31. The system as set forth in claim 30, wherein each data exchange response also includes time synchronization information, a new call-home schedule, and a server list.

* * * * *